(12) United States Patent  (10) Patent No.: US 7,853,644 B2
Ohara  (45) Date of Patent: Dec. 14, 2010

(54) CLIENT-SERVER SYSTEM

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1013 days.

(21) Appl. No.: 10/388,400

(22) Filed: Mar. 17, 2003

(65) Prior Publication Data

US 2003/0182367 A1 Sep. 25, 2003

(30) Foreign Application Priority Data

Mar. 22, 2002 (JP) .............................. 2002-080856
Jan. 15, 2003 (JP) .............................. 2003-007055

(51) Int. Cl.
*G06F 15/16* (2006.01)

(52) U.S. Cl. ........................ 709/203; 709/216; 709/217; 709/219; 709/227; 709/238

(58) Field of Classification Search ................. 709/203, 709/216, 217, 219, 227, 238
See application file for complete search history.

(56) References Cited

U.S. PATENT DOCUMENTS

| 5,313,408 | A |   | 5/1994  | Goto              |         |
|-----------|---|---|---------|-------------------|---------|
| 6,047,309 | A | * | 4/2000  | Dan et al.        | 709/201 |
| 6,108,703 | A |   | 8/2000  | Leighton et al.   |         |
| 6,173,322 | B1| * | 1/2001  | Hu                | 709/224 |
| 6,185,598 | B1|   | 2/2001  | Farber et al.     |         |
| 6,230,196 | B1| * | 5/2001  | Guenthner et al.  | 709/223 |
| 6,496,857 | B1| * | 12/2002 | Dustin et al.     | 709/219 |
| 6,553,413 | B1|   | 4/2003  | Leighton et al.   |         |
| 6,654,807 | B2|   | 11/2003 | Farber et al.     |         |
| 6,804,715 | B1| * | 10/2004 | Koseki et al.     | 709/224 |
| 7,028,072 | B1| * | 4/2006  | Kliger et al.     | 709/203 |
| 7,054,935 | B2|   | 5/2006  | Farber et al.     |         |
| 7,103,645 | B2|   | 9/2006  | Leighton et al.   |         |
| 7,215,436 | B2| * | 5/2007  | Hull et al.       | 358/1.15|

(Continued)

FOREIGN PATENT DOCUMENTS

EP 0 930 748 A2 7/1999

(Continued)

OTHER PUBLICATIONS

Office Action mailed Jun. 1, 2010 in Japanese Patent Application No. 2003-7055, with translation.

*Primary Examiner*—Ario Etienne
*Assistant Examiner*—Barbara N Burgess
(74) *Attorney, Agent, or Firm*—Oliff & Berridge, PLC

(57) ABSTRACT

A client-server system includes a client personal computer and a plurality of printers, all connected to a network. One of the printers broadcasts a GET request using SNMP at a predetermined timing to the other printers to obtain model name, idle rate, and information about image files stored in each of the other printers. Later, a Web browser of the client personal computer sends a Web page request. The printer receives this request. Based on the information obtained from the broadcast, a Web server inside the printer prepares HTML data and sends the HTML data to the client personal computer. The HTML data designates one or more of the other printers as image sources for the client to obtain or otherwise receive the image files from. Based on the HTML data, the Web browser of the client personal computer requests the image files from the other printers.

23 Claims, 23 Drawing Sheets

U.S. PATENT DOCUMENTS

| | | | |
|---|---|---|---|
| 2001/0047264 A1* | 11/2001 | Roundtree | 704/275 |
| 2001/0056500 A1* | 12/2001 | Farber et al. | 709/245 |
| 2002/0013838 A1 | 1/2002 | Kushida et al. | |
| 2002/0087654 A1* | 7/2002 | Feigenbaum | 709/214 |
| 2002/0188631 A1* | 12/2002 | Tiemann et al. | 707/513 |
| 2005/0198334 A1 | 9/2005 | Farber et al. | |
| 2006/0218265 A1 | 9/2006 | Farber et al. | |
| 2007/0005689 A1 | 1/2007 | Leighton et al. | |

FOREIGN PATENT DOCUMENTS

| | | |
|---|---|---|
| JP | A 3-276463 | 12/1991 |
| JP | A 4-253275 | 9/1992 |
| JP | A-11-203087 | 7/1999 |
| JP | A-2000-197165 | 7/2000 |
| JP | A 2001-69169 | 3/2001 |
| JP | A-2001-312484 | 11/2001 |
| JP | A-2002-503001 | 1/2002 |
| WO | WO 99/40514 | 8/1999 |

* cited by examiner

FIG.2

HTML DATA INDICATING MAIN PAGE

```
<HTML>
<HEAD>
.....
</HEAD>
<BODY>
<IMG SRC="/printer/modellogo.png"WIDTH="..."HEIGHT="...">     ← "MODEL NAME" IMAGE FILE NAME AND DISPLAY SIZE
<IMG SRC="/printer/buttonblue.png"WIDTH="..."HEIGHT="...">    ← "BLUE BUTTON" IMAGE FILE NAME AND DISPLAY SIZE
<IMG SRC="/printer/buttongreen.png"WIDTH="..."HEIGHT="...">   ← "GREEN BUTTON" IMAGE FILE NAME AND DISPLAY SIZE
.....
</BODY>
</HTML>
```

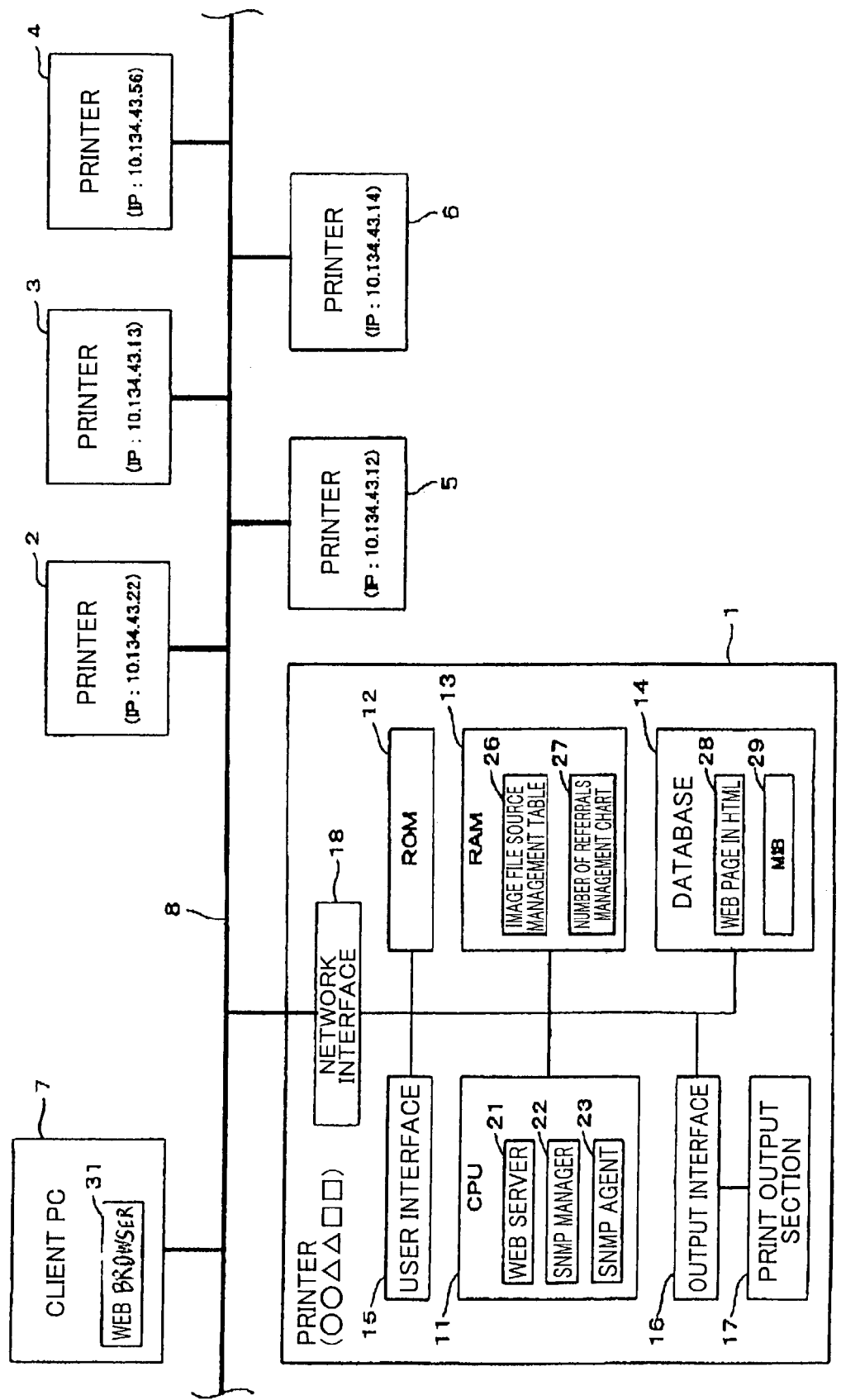

FIG.6(a)

IMAGE FILE SOURCE MANAGEMENT TABLE 26

| IMAGE FILE NAME | UNIQUE ID | IP1 | IP2 | IP3 | .... | IPn | Latest IP |
|---|---|---|---|---|---|---|---|
| Red Button | 101 | 10.134.43.22 | 10.134.43.13 | 10.134.43.56 | .... | 10.134.43.12 | 10.134.43.22 |
| Green Button | 102 | 10.134.43.22 | 10.134.43.13 | 10.134.43.14 | .... | | 10.134.43.13 |
| Blue Button | 103 | 10.134.43.22 | 10.134.43.13 | 10.134.43.14 | .... | | 10.134.43.13 |
| .... | .... | .... | .... | .... | .... | .... | .... |
| Model Logo | 902 | 10.134.43.22 | 10.134.43.13 | | .... | | 10.134.43.22 |

FIG.6(b)

NUMBER OF REFERRALS MANAGEMENT CHART

| IP ADDRESS | NUMBER OF REFERRALS |
|---|---|
| 10.134.43.22 | 0 |
| 10.134.43.13 | 0 |
| 10.134.43.56 | 0 |
| 10.134.43.12 | 0 |
| 10.134.43.14 | 0 |

FIG.7

HTML DATA FOR MAIN PAGE

```
<HTML>
<HEAD> . . . . . . . . . . . . . . . . . . .
</HEAD>
<BODY>
<IMG SRC="http://10.134.43.22/printer/modellogo.png"WIDTH="…"HEIGHT="…">
<IMG SRC="http://10.134.43.14/printer/buttonblue.png"WIDTH="…"HEIGHT="…">
<IMG SRC="http://10.134.43.13/printer/buttongreen.png"WIDTH="…"HEIGHT="…">
. . . . . . . . . . . . . . . . . . . . . . . . .
</BODY>
</HTML>
```

- "MODEL NAME" IMAGE FILE NAME AND DISPLAY SIZE
- "BLUE BUTTON" IMAGE FILE NAME AND DISPLAY SIZE
- "GREEN BUTTON" IMAGE FILE NAME AND DISPLAY SIZE

IP ADDRESS OF IMAGE SOURCE PRINTER

USER INTERFACE MAIN

CLIENT-SERVER SYSTEM

BACKGROUND OF THE INVENTION

1. Field of the Invention

The present invention relates to a client-server system including a client and a plurality of servers capable of bidirectionally sending and receiving data.

2. Description of the Related Art

A client-server system commonly includes a computer connected with various peripheral devices such as network printers and routers. Recently, the peripheral devices frequently include a built-in Web server. Such devices with a built-in Web server will be referred to as a built-in Web server for convenience sake. Japanese Patent Application Publication 10-269036 discloses a built-in Web server device.

Here, a system will be described with a personal computer and a printer connected to a network. The printer is an example of a built-in Web server device. The user can use the Web browser of the personal computer to access the Web server built into the printer in order to obtain information about the printer such as the printer status and settings of the printer. In this case, the Web browser of the personal computer displays the management setting screen (main page) shown in FIG. 1.

When the printer receives a hypertext transfer protocol (HTTP) GET request from the Web browser of the personal computer to display the management setting screen in FIG. 1, the Web server built into the printer prepares HTML (hypertext markup language) data to display the screen at the client side, and sends the data to the client. Then, the Web browser of the client receives and analyses the HTML data, and displays the main page shown in FIG. 1.

When the user clicks on hyperlinked characters or images on the main page, the built-in Web server of the printer sends the corresponding information about the printer, such as the printer's printing status and remaining amount of consumables, such as ink, toner, and paper. The information is displayed on the personal computer for the user's reference. The user can also designate various settings of the printer by clicking on the corresponding hyperlinked characters or images. In other words, the printer can be managed easily from the client side through the Web browser.

Incidentally, in the main page for performing the printer management settings shown in FIG. 1, nine types of images including a manufacturer name 71, a printer model name 72, a blue button 73, a green button 74, a red button 75, signals 76 though 78 and a printer appearance image 79 are displayed. However, when displaying each of these images, the Web browser must make an HTTP connection to the Web server for each image.

In other words, when there is the request from the Web browser to display the main page in FIG. 1, the Web server prepares HTML data and sends it to the client side. As shown in the example of FIG. 2, the HTML data does not include the data of the above-mentioned images themselves, but includes tags that indicate the source of the image files. The tags are written as <IMG SRC= . . . >. Note that the location of the image file is written as a uniform resource locator (URL).

Then, when the Web browser of the personal computer interprets the HTML data and displays the management setting screen shown in FIG. 1, each time there is an inscription such as <IMG SRC= . . . >, the Web browser makes an HTTP connection to the Web server, sends a GET request for the image file in order to download the image data from the designated URL, and then arranges the image file in place of the tag.

Therefore, when displaying the management setting screen in FIG. 1, in order to obtain HTML data and all nine image files for the main page shown in FIG. 2, the HTTP connection to the Web server is actually made 10 times, and each time the HTTP connection is made, the Web server responds to the various requests from the Web browser.

Generally, a built-in Web server device includes CPU with a smaller processing capacity than personal computers, such as those used specifically as a Web server. Therefore, when the Web browser of the personal computer sends many HTTP connection requests to the built-in Web server device, the limited capacity of the built-in Web server device's CPU may be taxed to the detriment of the built-in Web server device's main function.

In other words, when the Web browser sends many GET requests for image files, the HTTP processes performed by Web server of the built-in Web server device increase accordingly. The primary function of built-in Web server device can be adversely affected. For example, when the built-in Web server device is a printer, the printing processes can be adversely affected.

Further, as mentioned above, when there are many HTTP connection requests from the Web browser, there is also a danger of affecting the page display speed of the Web browser.

In other words, when the Web browser performs many GET requests for image files, the HTTP processes for the Web server in the integrated apparatus increases by a corresponding amount. As a result, it becomes impossible to respond quickly to GET requests from the Web browser of the personal computer.

SUMMARY OF THE INVENTION

It is an objective of the present invention to provide a client-server system allowing a client and a plurality of servers to bidirectionally send/receive data, in which a server-side processing load occurring upon a data request from the client is reduced.

In order to solve the above-mentioned problem, a client-server system connected to a network includes a data-providing server, a client, judging means, and an assisted server.

The data-providing server is connected to the network and stores data. The client is connected to the network and sends a data request over the network. The data request requests page data. The judging means is for judging the data stored in the data-providing server. The assisted server is connected to the network and stores the page data. The assisted server receives the data request from the client over the network and refers to the judging means to judge whether the data-providing server stores target data required to display, as a page, the page data requested by the client. Upon judging that the data-providing server stores the target data, assisted server instructs the client to receive the target data from the data-providing server instead of the assisted server providing the target data to the client.

With this configuration, when the client sends a data request to the assisted server, the assisted server itself does not send the requested data to the client. Rather, the data-providing server sends the requested data to the client if the data-providing server stores the requested data. As a result, the processing load required for transmitting data in response to the data request from the client is distributed to the data-providing server. The processing load on the assisted server can be reduced. Because the processing load of the assisted server is reduced, the request from the client can be responded to quickly and, consequently, the client can quickly obtain the requested data.

A method according to the present invention is for sending data to a client over a network that connects the client to a data-providing server and an assisted server. The data-providing server stores data. The client sends a data request over the network. The data request requests target data. The method includes judging data stored in the data-providing server, referring to the judging means to judge whether the data-providing server stores the target data requested by the client, and, upon judging that the data-providing server stores the target data, instructing the client to receive the target data from the data-providing server instead of the assisted server providing the target data to the client.

A recording medium according to the present invention is stores programs for controlling an assisted server connected to a data-providing server and a client through a network. The data-providing server stores data. The client sends a data request over the network. The data request requests page data. The recording medium stores a judging program and an assistance-receiving program. The judging program judges the data stored in the data-providing server. The assistance-receiving program receives the data request from the client over the network. The assistance-receiving program refers to results of the judging program to judge whether the data-providing server stores target data required to display, as a page, the page data requested by the client. Upon judging that the data-providing server stores the target data, assistance-receiving program instructs the client to receive the target data from the data-providing server instead of the assisted server providing the target data to the client.

A program according to the present invention controls an assisted server connected to a data-providing server and a client through a network. The data-providing server stores data. The client sends a data request over the network. The data request requests page data. The program includes a judging process and an assistance-receiving process. The judging process judges the data stored in the data-providing server. The assistance-receiving process receives the data request from the client over the network. The assistance-receiving process refers to results of the judging process to judge whether the data-providing server stores target data required to display, as a page, the page data requested by the client. Upon judging that the data-providing server stores the target data, the assistance-receiving process instructs the client to receive the target data from the data-providing server instead of the assisted server providing the target data to the client.

BRIEF DESCRIPTION OF THE DRAWINGS

In the accompanying drawings:

FIG. 2 illustrates HTML data used to obtain the images displayed on the printer management setting screen of FIG. 1;

FIG. 3 is a block diagram showing basic configuration of a network system according to a first embodiment of the present invention;

FIG. 6A represents an image file source management table generated in memory of the one printer;

FIG. 6B represents a number of referrals management chart generated in memory of the one printer;

FIG. 7 illustrates HTML data generated by a Web server in the one printer;

DETAILED DESCRIPTION OF THE EMBODIMENTS

Figure 1:
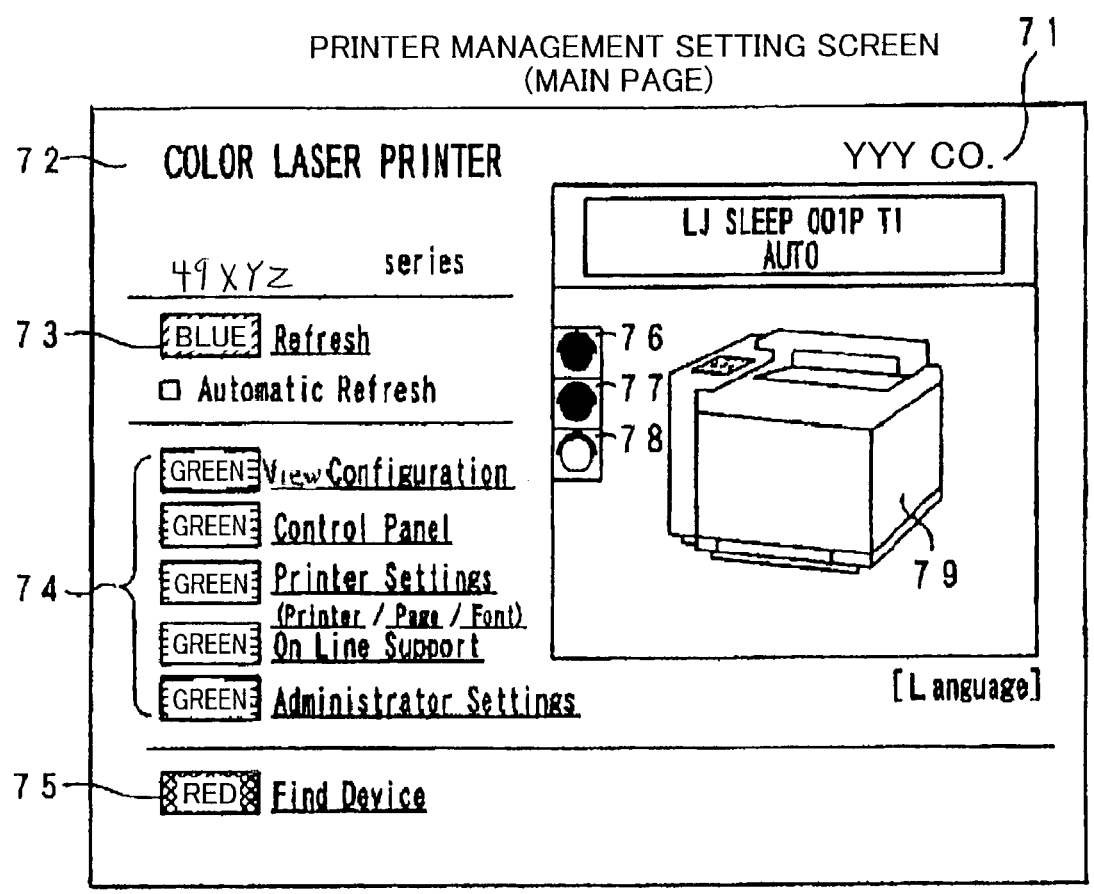
FIG. 1 illustrates a printer management setting screen displayed on a personal computer screen of a conventional network.

Hereinafter, explanation is made regarding embodiments of the present invention, based on the drawings.

FIG. 3 is a block diagram showing an outline construction of a network system according to a first embodiment. As shown in FIG. 3, in the network system according to this embodiment, a client personal computer (PC) 7 and printers 1 through 6 are connected to a network 8, such as a LAN, and are capable of bidirectionally sending and receiving data. Note that although omitted in the diagram, a plurality of other client PCs other than the client personal computer 7 are also connected to the network 8. Print jobs generated at the client PC can be printed or otherwise outputted at the printers 1 through 6.

The client personal computer 7 has a built-in Web browser 31, and by using this Web browser 31, various managements/settings of each of the printers 1 through 6 can be performed. Further, since the printers 1 through 6 have the same basic configuration, the following explanation will be made regarding the printer 1.

The printer 1 is composed of a CPU 11, a ROM 12, a RAM 13, a database 14, a user interface 15, an output interface 16, a print output section 17, and a network interface 18.

The CPU 11 executes various controls on the printer 1, based on various programs stored in the ROM 12. In particular, the CPU 11 is equipped with such functions as a Web server 21, an SNMP manager 22, and an SNMP agent 23.

From the Web browser 31 provided in the client personal computer 7, an HTTP connection can be made to the Web server 21. Thus, a printer management/setting screen (a main page) shown in FIG. 3 is displayed on a display device (not shown) provided to the client personal computer 7. Therefore, the user of the client personal computer 7 can confirm status of the printer 1 and make various settings using the Web browser 31.

The simple network management protocol (SNMP) is a commonly known protocol for monitoring and controlling, through the network, the various apparatuses connected to the network. In accordance with this embodiment, the SNMP manager 22 can obtain desired information from the other printers 2 through 6 by designating an object identifier (OID) that corresponds to the desired information in a management information base (MIB). Conversely, when the other printers 2 through 6 request information using an OID designation, the SNMP agent 23 returns the designated MIB data.

The RAM 13 stores an image file source management table 26 and a number of referrals management chart 27 that are generated when the printer 1 starts operating. The SNMP manager 22 accumulates various information relating to the other printers 2 through 6 and updates the image file source management table 26 based on the information. The number of referrals management chart 27 is cleared each time the contents of the image file source management table 26 is updated. Details of these are explained below.

The database 14 is configured from a hard disk or other storage device and includes a Web page 28 and an MIB 29. The Web page 28 stores various data necessary for preparing the HTML data in response to requests from the Web browser 31. The MIB 29 includes various information about the printer 1 arranged in a tree form.

The user interface 15 includes a liquid crystal display for displaying various information, such as the status and operation mode of the printer 1, and key switches for inputting commands to the printer 1. Then, the print output section 17 is provided with mechanisms, such as a laser scanning mechanism, a photosensitive body, a transfer body, and a developing device, for actually printing onto a printing medium a print job generated at the client personal computer 7 and inputted via the network 8 and the network interface 18. The print output section 17 performs the print output based on the print data inputted via the output interface 16.

Figure 4:
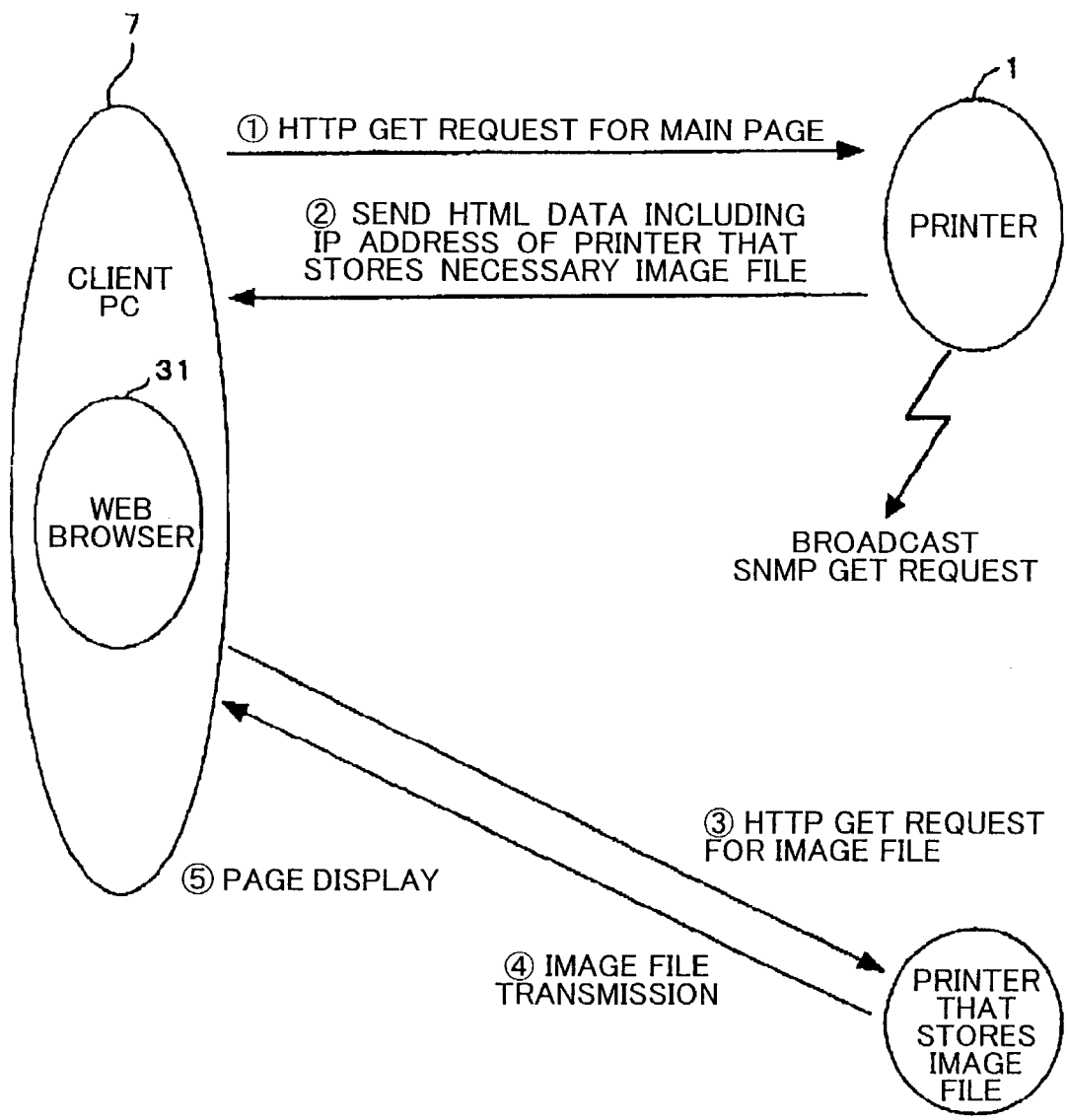
FIG. 4 illustrates flow of data in the network system shown in FIG. 3 in order to obtain images displayed on a printer management setting screen.
Figure 5:
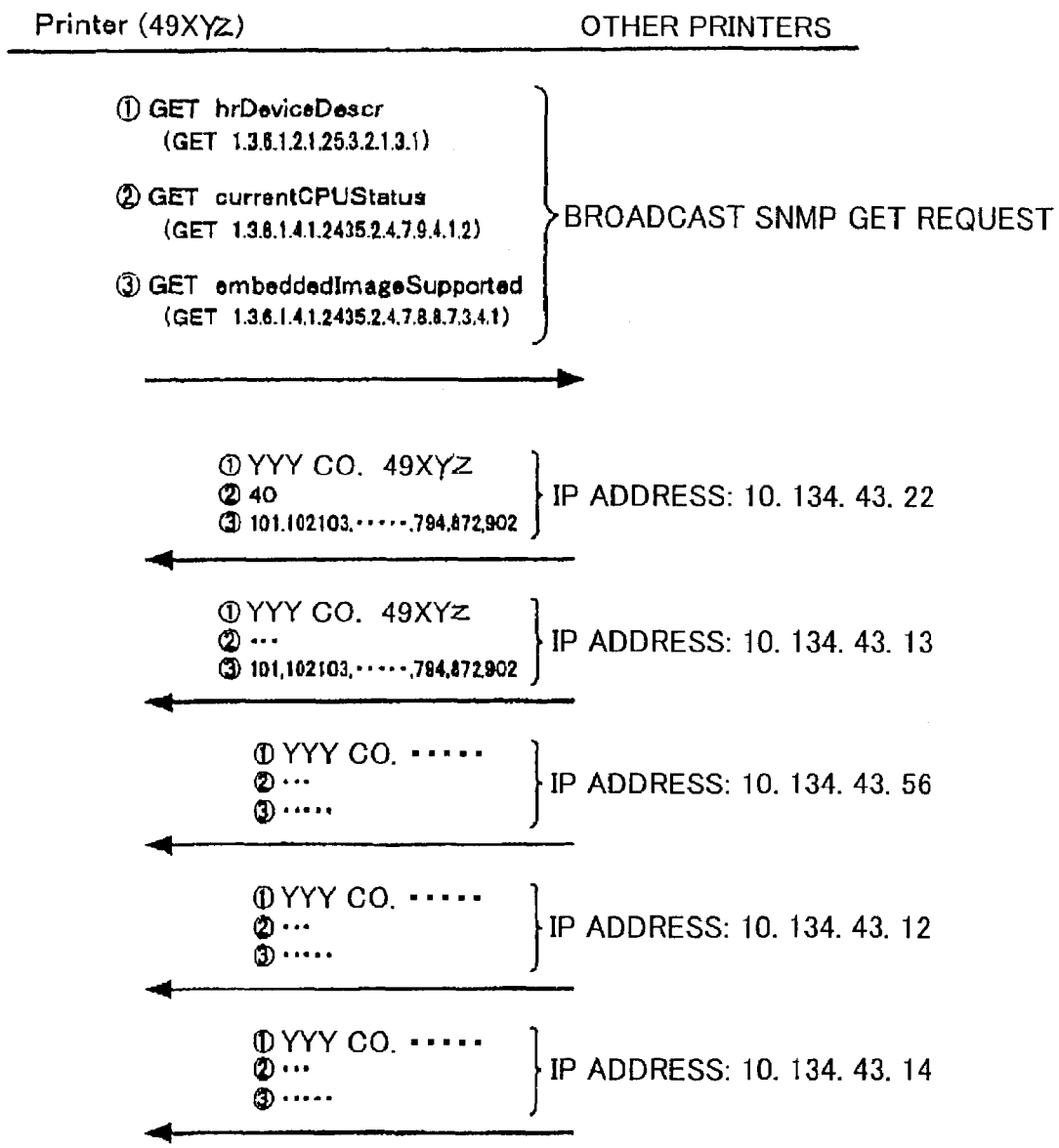
FIG. 5 illustrates flow of data when one printer of the system broadcasts an SNMP GET request to obtain information from other printers.

Various information exchanged between the client personal computer 7 and the printers 1 through 6 will be described in more detail with reference to FIGS. 4 through 7. FIG. 4 is an explanatory diagram showing an example of a flow of data in the network system according to this embodiment. FIG. 5 is an explanatory diagram for explaining how the information of the other printer is obtained by the printer 1 broadcasting an SNMP GET request. FIG. 6A shows details of the image file source management table 26 prepared at the printer 1. FIG. 6B shows the number of referrals management chart 27 prepared at printer 1. FIG. 7 is an explanatory diagram showing an example of the HTML data generated by the Web server 21.

As shown in FIG. 4, the printer 1 broadcasts the SNMP GET request at a predetermined timing, such as every 10 seconds, to the other devices connected to the network 8. The contents of a GET request is specifically as indicated by ①through ③in FIG. 5. By using the broadcast, the printer 1 inquires regarding ①the device's model name (hrDeviceDescr), ②its idle rate (current CPU Status), and ③image files (embeddedImage Supported: hereinafter, referred to as an "image file") stored by the device. The idle rate is a load margin level indicating how much of the total processing capacity of a device remains unused. Note that a GET request is actually performed by designating an OID. For example, in the case of the model name, the corresponding OID "1.3.6.1.2.1.25.3.2.1.3.1" is designated.

Then, as a result of the broadcast of a GET request from the printer 1, the information corresponding to each of the above-mentioned ①through ③is returned as a GET response from each device, that is, the printers 2 through 6 in this embodiment. As shown in FIG. 5, the printer 2 having the IP address 10.134.43.22 returns ①the model name "49XYZ, produced by YYY Company.", ②the idle rate of "40" (unit: %), and ③the unique ID "101, 102, 103 . . . , 794, 872, 902" of image files stored by the printer. The other printers 3 through 6 each also return information corresponding to the above-mentioned ①through ③back to the printer 1 as shown in FIG. 5.

On the other hand, when the printer 1 is turned on, the image file source management table 26 shown in FIG. 6A, and the number of referrals management chart 27 shown in FIG. 6B are prepared inside the RAM 13. Note that at the time when the printer is started up, in the items in image file source management table 26, the image file name and the unique ID have been set in advance, but other items ("IP1" through "IPn" and "Latest IP") are still unset. Further, in the number of referrals management chart 27, the chart itself is prepared, but an item "IP address" and an item "number of referral times" are both in an unset state.

The nine image files used on the main page shown in FIG. 5 are set as image file names. Examples are "Red Button", "Green Button", "Blue Button" and "Model Logo" (Model Name). A unique ID managed by the printer maker is assigned to each of these image files. This unique ID is set for each image file in a "unique ID" column in the image file source management table 26. As described above, the main page shown in FIG. 1 is configured from a plurality of image files.

In this way, the unset items in the image file source management table 26 prepared when the printer is started up are filled according to the information ①through ③of each printer obtained by the above-mentioned broadcast. Specifically, the GET response from each of the printers 2 through 6 is analyzed to obtain the information ③, that is, the unique ID of image files stored in each of the printers 2 through 6. Based on the information ③, it is determined whether any of the printers 2 through 6 store some or all of the image files indicated in the leftmost column of the image file source management table 26. When a printer is judged to stored one or more of the image files, then the IP address of that printer is registered in the column "IP1-" corresponding to the image file.

In the present embodiment, the printer 2 and the printer 3 are exactly the same model as the printer 1, so both the printers 2 and 3 store all of the image files that are stored in the printer 1, that is, all of the image files indicated in the leftmost column of the image file source management table 26. Therefore, the unique IDs of all the image files are included as the information ③in the GET response from the printers 2 and 3. Further, even though the other printers 4 through 6 are not the same model as the printer 1, some store a portion of the image files of printer 1.

Therefore, IP addresses are written into the image file source management table 26 as shown in FIG. 6A. For example, in the case of "Red Button", the printer 2 (IP: 10.134.43.22), the printer 3 (IP: 10.134.43.13), the printer 4 (IP: 10.134.43.56) and the printer 5 (IP: 10.134.43.12) each have the image file thereof. Therefore, the IP addresses of each of these printers 2 through 5 are registered into the columns "IP1" through "IPn" in the "Red Button" row. The same is true for the other image files, and each IP address is registered as shown in FIG. 6A.

Note that the IP addresses of the printers having the image file are not all registered as is. Rather, considering the idle rate ②, the IP address of the printer is written only when the idle rate ② reaches a predetermined level (50% in this embodiment) or higher, that is, when the capacity of the printer is not being strained and there is margin in the printer's capacity to process data.

In order to display the main page shown in FIG. 1 on the display of the personal computer 7, the Web browser 31 of the client personal computer 7 sends a HTTP GET request, that is, the HTML request for the main page represented by ① in FIG. 4, to the printer 1. When the printer 1 receives the HTTP GET request, the built-in Web server 21 of the printer 1 prepares HTML data for the main page.

At this time, for each image file, the HTML with the tag <IMG SCR= . . . > designating a URL where the image file is located, is created. However, not all the designated URLs are the URLs inside the printer itself. Rather, for each image file, the URLs in the other printers 2 through 6 are designated as appropriate, whereby the client personal computer 7 requests the image files from the printers 2 through 6 (in other words, the processing load of the printer 1 is distributed).

Specifically, the HTML data for the main page as shown in FIG. 7 is prepared, and is sent to the client personal computer 7 (② in FIG. 4). As is clear from comparing FIG. 7 with FIG. 2, the HTML data shown in FIG. 7 designates URLs that indicate printers other than the printer 1 as image sources. For example, as the image source for the "model name", the printer 2 having the IP address "10.134.43.22" is designated. As the image source for the "Blue Button", the printer 6 having the IP address "10.134.43.14" is designated. As the image source for the "Green Button", the printer 3 having the IP address "10.134.43.13" is designated. With respect to the other image files as well, illustration in the diagrams is omitted but one of the printers 2 through 6 is designated as the image source.

The image source IP address of the printer is designated based on the image file source management table 26. For example, when determining the image source for the "Red Button", first it is determined whether or not any IP address is registered in the "Latest IP" space of the "Red Button" row. If so, then the IP address in the "Latest IP" space is designated as the image source. If not, then one of the IP addresses written into the columns "IP1" through "IPn" is designated.

The "Latest IP" is the IP address that was actually used as an image source when the HTML data was most recently prepared, such as the immediately previous time. The IP address registered at this time is given priority for use as the image source. That is, when designating an image source, the IP address that was designated immediately previously is designated with priority over any other of the registered IP addresses.

The "Latest IP" is used instead of any other IP addresses because when the client personal computer 7 has obtained an image file from a printer in the past, the client personal computer 7 saves the image file as cache data in a memory (not shown). Therefore, when the client personal computer 7 needs the same image file again, if the printer that was actually designated as the image source previously is again designated, then the client personal computer 7 can obtain the image file from the cache data memory without referring to the printer again.

Further, when no IP address is registered in the "Latest IP" column, then the number of referrals management chart 27 of FIG. 6B is also used to designate one of the IP addresses written into the columns "IP1" through "IPn". As an example, no IP address will registered in the "Latest IP" column immediately after starting up the printer, because no main page requests will have yet been received from the Web browser 31. When the image file source management table 26 includes the IP addresses of the printers based on responses to the SNMP GET request broadcasted by the printer 1, then all of these IP addresses are written into the "IP address" column of the number of referrals management chart 27.

The IP address with the smallest "number of referral times" in the number of referrals management chart 27 is designated as an image source when designating when one of the IP addresses in the columns "IP1" through "IPn" of the image file source management table 26. That is, the IP addresses are not merely randomly selected from the IP addresses in the columns "IP1" through "IPn".

Each time the image source IP address corresponding to the individual image files is designated, the "number of referral times" of the IP address in the number of referrals management chart 27 is incremented. Accordingly, uneven designation of just one specific IP address is prevented so that all the printers capable of being referred to for use as image sources can be designated uniformly.

The Web server 21 then prepares HTML data such as that shown in FIG. 7 and sends the HTML data to the client personal computer 7. The client personal computer 7 analyses the HTML data, which designates one of the other printers 2 through 6 as the image source for each of the image files for the images 71 through 79. Then, the client personal computer 7 sends GET requests to the image source printers for each image file (③ in FIG. 4).

When a printer receives a GET request from the client personal computer 7, it sends the requested image file to the client personal computer 7 (④ in FIG. 4). Once the client personal computer 7 receives the image files, the client personal computer 7 displays the images to display, for example, the main page shown in FIG. 1, on its display device (not shown) (⑤ in FIG. 4).

Figure 8:
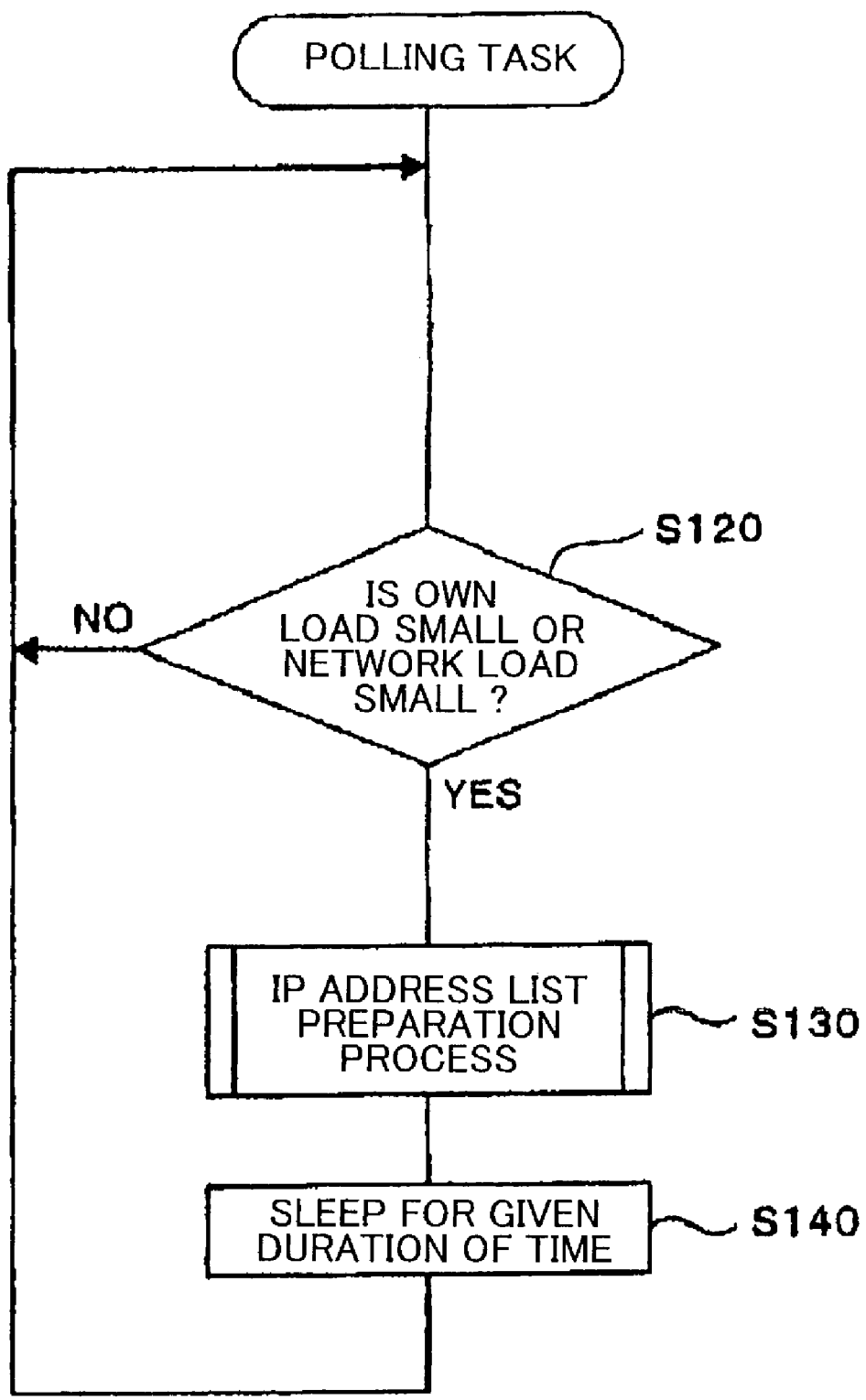
FIG. 8 is a flowchart representing a polling task executed by the printer according to the first embodiment.

Next, an IP address list preparation process performed by the printer 1 will be described with reference to the flowcharts of FIGS. 8 and 9. The IP address list preparation process is for writing the IP addresses for each image file in the image file source management table 26. FIG. 8 represents a polling task performed at a predetermined timing in order to prepare the IP address list. Immediately after turning on the printer 1, the CPU 11 reads out a polling task program from the ROM 12, and executes processes according to the program.

When the processes are started, first, at step (hereinafter, abbreviated as "S") 120, it is judged whether or not the processing load amount of the printer 1 itself is small, or whether or not the traffic on the network 8 is small. Detection of the processing load amount of the printer 1 itself is achieved by using synchronizing interruption to sample availability for a low-priority task executed by the CPU 11 and an idle loop hit rate. When the load condition level is smaller than a preset and predetermined low level, it is judged that the processing load amount is small. Further, regarding traffic level of the network 8, the judgment can be made based on the number of packets flowing on the network 8, and when the number of packets does not reach a predetermined level, it is judged that the traffic level of the network 8 is small. If neither the processing load amount nor traffic on the network 8 is small, then S120 is repeated.

However, when either one is small, the program advances to S130. At S130, the above-mentioned IP address list preparation process is executed. Details of the process are as shown in FIG. 9. As shown in FIG. 9, first, at S210, all the data in "IP1" through "Pin" in the image file source management table 26 are cleared. Next, at S220, the SNMP GET request is broadcasted to inquire about the model names (hrDeviceDescr), idle rates (current CPU Status) and the image files (embedded Image Supported) of all the printers 2 through 6 connected to the network 8. The processes in S220 may be performed as a function of the SNMP manager 22. As explained in FIG. 5, the GET responses from the printers 2 through 6 are returned.

Then, at S230, a time t is set as the current time c_time( ) and the program advances to S240. At S240, it is judged whether or not a packet including the GET responses from the printers 2 through 6 was received. If not (S240: NO), then the program proceeds to S280. When a packet is received (S240: YES), then the program proceeds to S250 and the received packets are examined one at a time, that is, the GET responses from each of the printers 2 through 6 are examined.

Next, at S260, it is judged whether or not the idle rate of the printer that transmitted the packet is equal to or higher than 50%. The idle rate of the printer is included in the received packet, that is, in the GET responses. When the idle rate is less than 50%, which means that the processing load amount of the corresponding printer is great, then the program advances to S280. When the idle rate is equal to or higher than 50%, which means that the processing load amount of the corresponding printer is relatively small, then the program advances to S270.

At S270, the IP address list is prepared by writing (registering) the IP address of the printer that sent the received packet into the image file source management table 26. The IP address is written into the row that corresponds to the unique ID of the image file that is stored in the printer that sent the received packet. The unique ID is included in the received packet.

At S280, it is judged whether or not the elapsed time since the time t has exceeded a predetermined time duration T1. When the time duration T1 is not yet exceeded, the program returns again to S240, and processes similar to that as described above is performed with respect to the other packets. However, when the time duration T1 has elapsed, the program proceeds to S290 and the number of referrals management chart 27 is prepared. Note that the predetermined time duration T1 is set to a time sufficient to receive the packets from all the printers 2 through 6 after the broadcast and perform the IP address list preparation process based on the packets. In this example, the predetermined time duration T1 is set to 5 seconds.

Therefore, by the time the program proceeds to S290, typically, the packets received from all the printers 2 through 6 have all been processed. In this case, the number of referrals management chart 27 shown in FIG. 6B is prepared with the IP addresses of the printers 2 through 6 listed in the "IP address" column. Note that at this time, the IP addresses of the printers 2 through 6 are registered in the image file row in the image file source management table 26 as well as shown in FIG. 6A.

When the printer 1 designates another printer 2 to 6 in order to reduce its own processing load, if the other printer has an extremely high processing load itself, then there is a danger of adversely affecting the processes that are being executed by the other printer. Therefore, the printer 1 does not designate the printers 2 to 6 as substitutes unconditionally. Rather, when the load margin level of one of the other printers 2 to 6 does not exceed a predetermined value, then this means that the other printer has no reserve processing capacity so the printer 1 does not designate the other printer to perform a substitute transmission. Therefore, the printer 1 can prevent problems that affect processes at the other printers while also reducing the processing load of the printer 1 itself.

After the process at S290, the program proceeds to S140 of FIG. 8, and enters the sleep mode for a given time duration of, for example, 10 seconds. Then, after the given time duration elapses, the program returns again to S120, and subsequently, the same processes are repeated.

Because printer 1 performs the polling task at a predetermined timing, the printer 1 knows what data the other printers 2 to 6 store in advance. Therefore, the processing load of the printer 1 is reduced and the printer 1 can immediately respond to the data request from the client personal computer 7 based on the judgment result, and the data can be quickly obtained the client personal computer 7 as well.

However, as described above, in the polling task of this embodiment, the SNMP GET request is not necessarily broadcasted at a predetermined timing (for example, every 10 seconds). Rather, the printer 1 first gains an understanding of its own processing load. The above-mentioned broadcast is executed to prepare the IP address list by writing or updating the data in the image file source management table 26, only when the processing load amount of the printer 1 itself is great, or when either the processing load amount of the printer 1 itself is small or traffic on the network 8 is low. Said differently, if the processing load of the printer 1 is not so great, then this means that the printer 1 has sufficient processing capacity to transmit images to the client personal computer 7 by itself, without distributing the load to the other printers 2 to 6. The printer 1 only investigates whether the other printers 2 to 6 store the desired data when it judges that its processing load is greater than the high level. Therefore, which printers have the same image files is not frequently investigated and the IP address list preparation process is not executed frequently. When the traffic on the entire system is small, there is a margin in the data amount flowing through the communications paths among the printers 1 to 6. With this operation, there is no influence on the other processes of the printers 1 to 6 or on the other communications in the system. This is extremely efficient.

Figure 10:
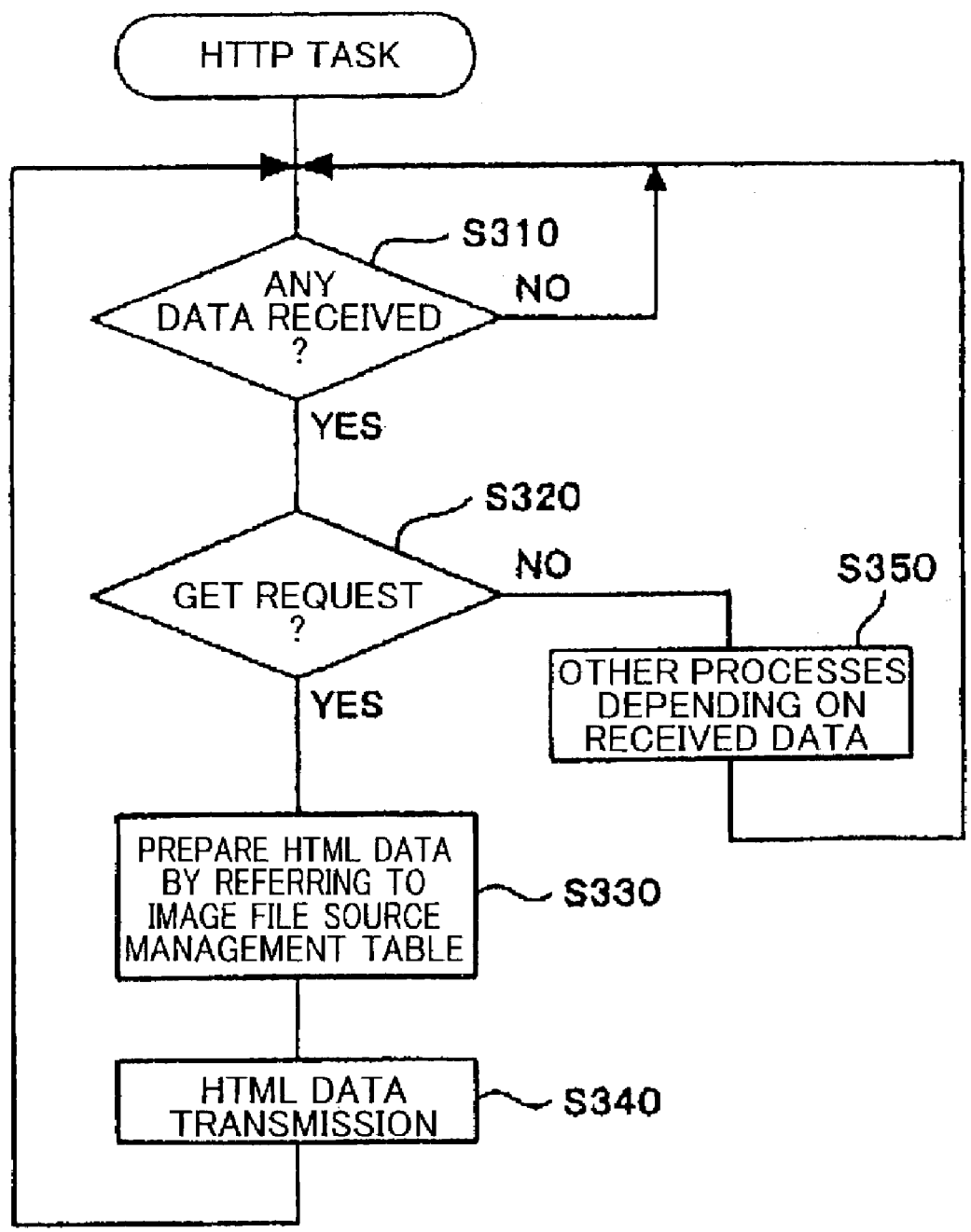
FIG. 10 is a flowchart representing an HTTP task executed by the one printer.

Next, an HTTP task will be described with reference to FIG. 10. The HTTP task is performed when an HTTP GET request is received from the Web browser 31 in the client personal computer 7 and is executed simultaneously with the above-mentioned polling task. FIG. 10 is a flowchart representing the HTTP task executed by the CPU 11 in the printer 1. This HTTP task is executed as a function of the Web server 21.

When this task is started, first, at S310, it is judged whether or not there is HTTP received data. The process at S310 is repeatedly performed while there is no received data. However, when there is received data, the program advances to S320, and it is judged whether or not the received data is a GET request.

When the received data is a GET request for requesting the main page shown in FIG. 1 (S320: YES), the program advances to S330, and the HTML data shown in FIG. 7 is prepared based on the image file source management table 26. Note that at this time, which printer is designated as the image source for each image file is determined by executing a load distribution algorithm described below with reference to FIG. 11.

When the HTML data shown in FIG. 7 is prepared at S330, next, at S340, the HTML data is sent to the client personal computer 7, and the program returns again to S310. On the other hand, when the received data is not a GET request and a negative determination is made at S320, the program advances to S350, the process corresponding to the received data is executed, and the program returns again to S310. A POST request is an example of the received data other than a GET request.

Figure 11:
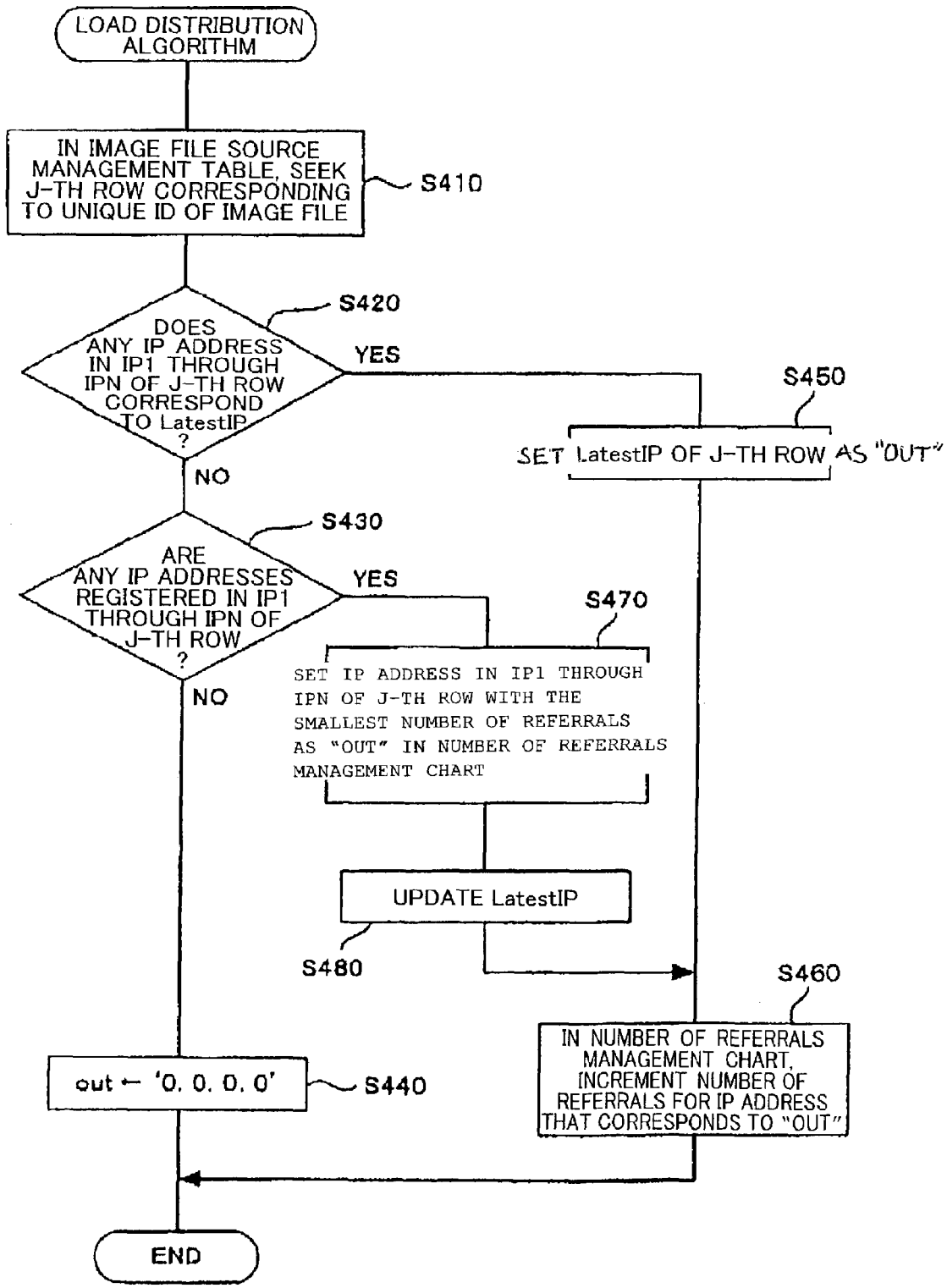
FIG. 11 is a flowchart representing a load distribution algorithm executed at the HTML data preparation time at S330 in the HTTP task shown in FIG. 10.

Next, the load distribution algorithm will be described with reference to FIG. 11. The load distribution algorithm is executed when preparing HTML data in S330 of the HTTP task represented by the flowchart of FIG. 10. FIG. 11 is a flowchart representing the load distribution algorithm. The load distribution algorithm is executed for each image file to designate the image source of each image file in the process of preparing the HTML data.

When the load distribution algorithm is started for a certain image file, then which row of the image file source management table 26 corresponds to the unique ID of the certain image file is determined and designated as the j-th row in S410. Next, it is judged in S420 whether or not any IP address "IP1" through "IPn" in the j-th row is the same as the "Latest IP". If so (S420: YES), then in S450 an "out" value is set to the "Latest IP". The "out" value indicates the IP address of the image source for the image file presently under consideration. For example, when the "Red Button" is designated as the j-th row in S410, then in S420 it is judged that the IP address of 10.134.43.22 is registered in the image file source management table 26 in FIG. 6A at both the "IP1" column and the "Latest IP" column. As a result, the program proceeds to S450, whereupon the "out" value indicating the IP address of the image source is set at S450 to the "Latest IP" of the j-th row, namely to the IP address of 10.134.43.22.

Next, at S460, the number of referral times for the IP address that corresponds to the "out" value set in S450 is incremented in the number of referrals management chart 27. On the other hand, if no IP address "IP1" through "IPn" in the j-th row is the same as the "Latest IP" (S420: NO), then the program advances to S430, and it is judged whether or not any IP address is registered in the j-th row. If not (S430: NO), then the program advances to S440 and "out" value is set to 0.0.0.0, and the algorithm ends. When the "out" value is set to 0.0.0.0 in S440, this means that no other printer has the image file so it is impossible to obtain the image file from another printer.

In this way, when the "out" is set to 0.0.0.0, the HTML data is prepared so that none of the other printers are referred to as images sources for the image file.

When at least one IP address is registered in the j-th row (S430: YES), then the program advances to S470. In S470, the IP address with the smallest number of referral times in the number of referrals management chart 27 is set as "out". Next, at S480, the "Latest IP" column corresponding to the image file in the image file source management table 26 is updated to the IP address set as "out". After that, the program advances to S460, and the number of referral times of the IP address set to "out" is incremented, and the process ends.

The explanation given up to this point has centered on the printer 1, and the case where the built-in Web server 21 sends the HTML data to the Web browser 31 is given as an example. However, as mentioned above, the Web server, the SNMP manager and the SNMP agent can be integrated into the other printers 2 through 6, similarly to printer 1. Therefore, even when the HTTP GET request is performed from the client personal computer 7 to the printers 2 through 6, the various processes similar to as those described above are performed.

As explained above, the Web server 21 prepares the HTML data in response to the main page GET request from the PC-side Web server 31 so that the HTML data designates the other printers 2 through 6, rather than the Web server 21 of the printer 1, as the image sources of the image files to be displayed on the main page. The Web browser 31 analyses the HTML data and sends out a GET request for obtaining the image files to the designated image sources.

Because the printer 1 does not send the image data itself to the personal computer 7, the CPU 11 of the printer 1 can reduce its own processing load amount relating to the client personal computer 7 displays the Web page, and also the main page can be quickly displayed at the client personal computer 7. Moreover, the printer having the image file is not designated unconditionally. Rather, the printer with the low idle rate and the great processing load amount is disqualified as the image source, and further, when the plurality of printers have the same image file, the printer having the smallest number of referral times is designated as the image source with priority. Therefore, there is extremely little danger of adversely affecting the process that is being executed on the printers other than the printer 1.

Further, when the image source is designated, the IP address (the Latest IP) designated as the image source when HTML data was most recently prepared, that is, when HTML data was prepared immediately previously, is given priority. The effects of this feature are greater at the personal computer 7 that at the printer 1. That is, the client personal computer 7 can effectively use the image data that was previously obtained and cached in the memory.

Figure 12:
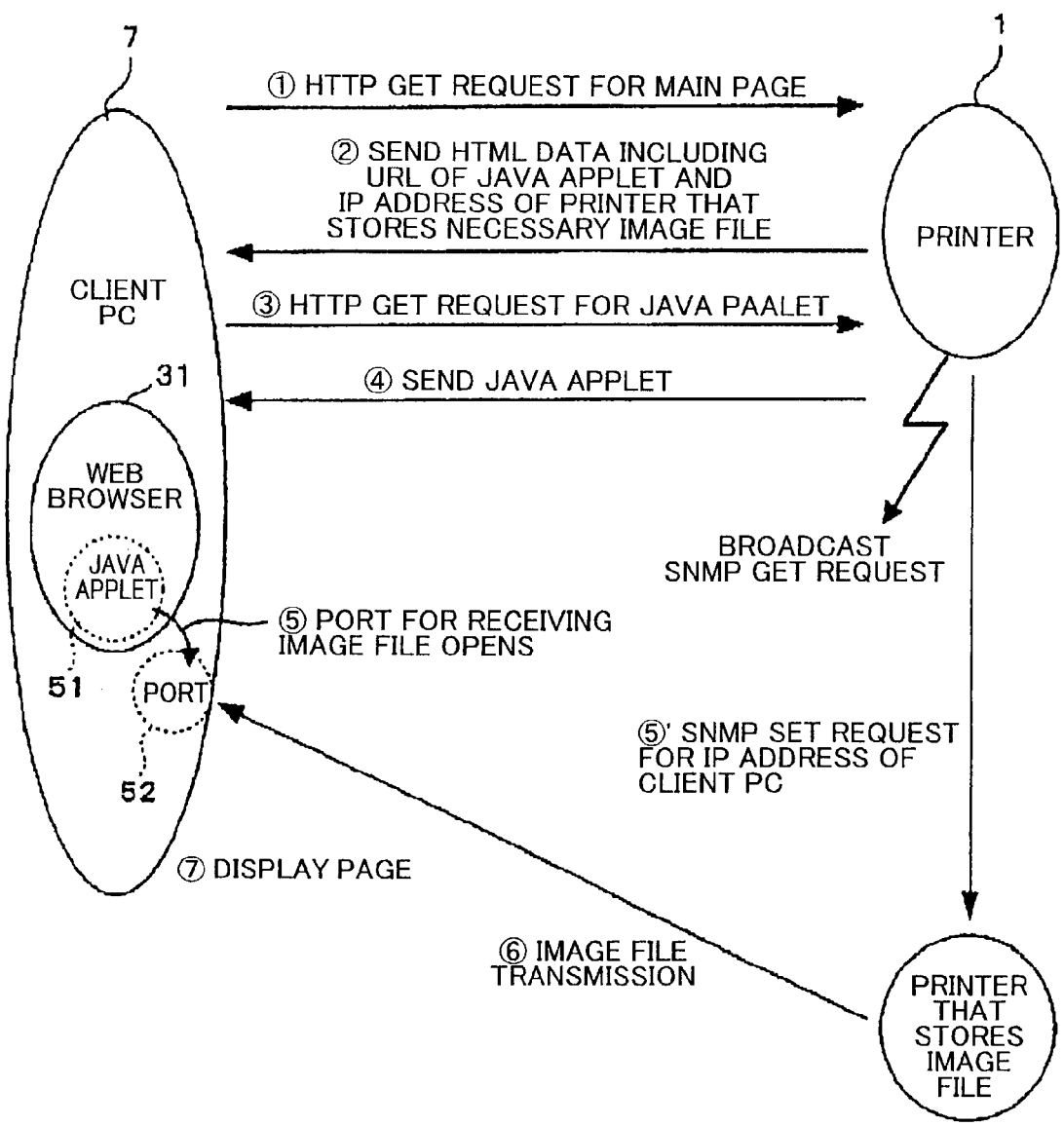
FIG. 12 illustrates flow of data in a network system according to a second embodiment of the present invention.

Next, a second embodiment will be explained. FIG. 12 is an explanatory diagram showing one example of a flow of data in a network system according to this embodiment. The network system of the second embodiment has the same configuration as the network system of the first embodiment shown in FIG. 3. Further, printers 1 through 6 each execute the polling task in FIG. 8, execute the IP address list preparation process in FIG. 9, broadcast an SNMP GET request to obtain the information about the other printers as shown in FIG. 5, and use a Web server to designate image sources for image files based on this information in the same way as the first embodiment. Therefore, also in this embodiment, explanation is made with reference to FIG. 3, FIGS. 5 through 6B, and FIGS. 8 and 9 as appropriate. The printers 1 through 6 will be described by referring to the printer 1 as a representative example.

As shown in FIG. 12, in accordance with the network system of this embodiment, when a GET request for a main page shown in FIG. 1 is sent from the Web browser 31 of the client personal computer 7 to the built-in Web server 21 (①), the Web server 21 prepares the HTML data corresponding to the request and sends it to the client personal computer 7 (②).

At this time, the image source of the image file is not designated by the IMG element tag in the manner shown in FIG. 7. Rather, a URL of a Java applet ("Java" is a registered trademark) having the IP address of the printer with the image file as its parameter, is included in the HTML data. Note that the Java applet is a commonly known Java program that can be downloaded through the network to the Web browser and embedded into the browser window and executed.

The Web browser 31 in the client personal computer 7 that received the HTML data examines the Java applet URL and automatically sends a Java applet GET request to the printer 1 (③). Accordingly, the Java applet 51 is returned from the printer 1 (④). The client personal computer 7 having received the Java applet 51 waits for the Java applet 51 to open a port 52 and for the image file to be sent from the printer at the IP address given as the parameter (⑤).

On the other hand, the printer 1 sends the unique ID of the image file and the IP address of the client personal computer 7 via SNMP to the other printer that stores a desired image file (⑤'). More specifically, the MIB transmission is an SNMP SET request for instructing to send the image file to the client personal computer 7. Then, the printer having received the SET request examines the MIB, and sends the image file to the designated address, that is, to the client personal computer 7 in this example (⑥). The client personal computer 7 receives the transmitted image file and displays the image file (⑦).

Figure 13:
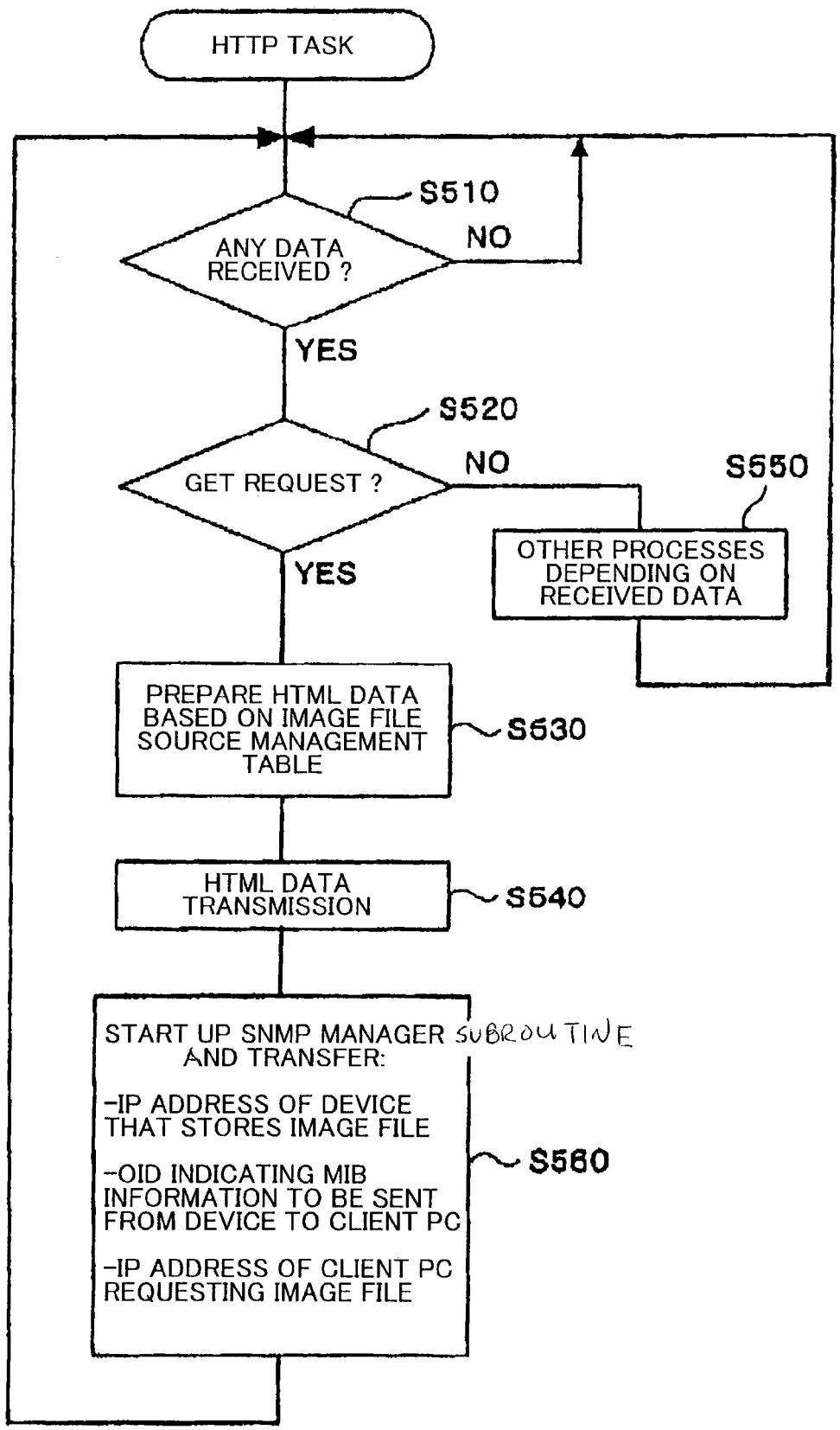
FIG. 13 is a flowchart representing an HTTP task executed by a printer according the second embodiment.

Next, an HTTP task will be explained with reference to FIG. 13. The HTTP task is performed when an HTTP GET request is received from the Web browser 31 of the client personal computer 7. The HTTP task is performed in parallel with the above-mentioned polling task represented by the flowchart of FIG. 8. In the HTTP task of FIG. 13, processes of S510 through S550 are similar to the processes of S310 through S350 in the HTTP task shown in FIG. 10 of the first embodiment, so detailed explanation thereof is omitted here. However, the HTML data prepared in the HTML data preparation process in S530 is different from the HTML data in FIG. 7. That is, the HTML data includes the Java applet as described above.

When the received data from the client personal computer 7 is an HTTP GET request, the HTML data is prepared based on the image file source management table 26, and the prepared HTML data is sent to the client personal computer 7 in S510 through S550. Then, at S560, an SNMP manager routine performed by the SNMP manager 22 is started up. Also, the IP address of the printer that has the image file, the OID of the MIB that should be sent from that printer (at that IP address) to the client personal computer 7, and the IP address of the client personal computer 7 that requested the image file are transferred to the SNMP manager 22. After that, the program returns to S510.

Figure 14:
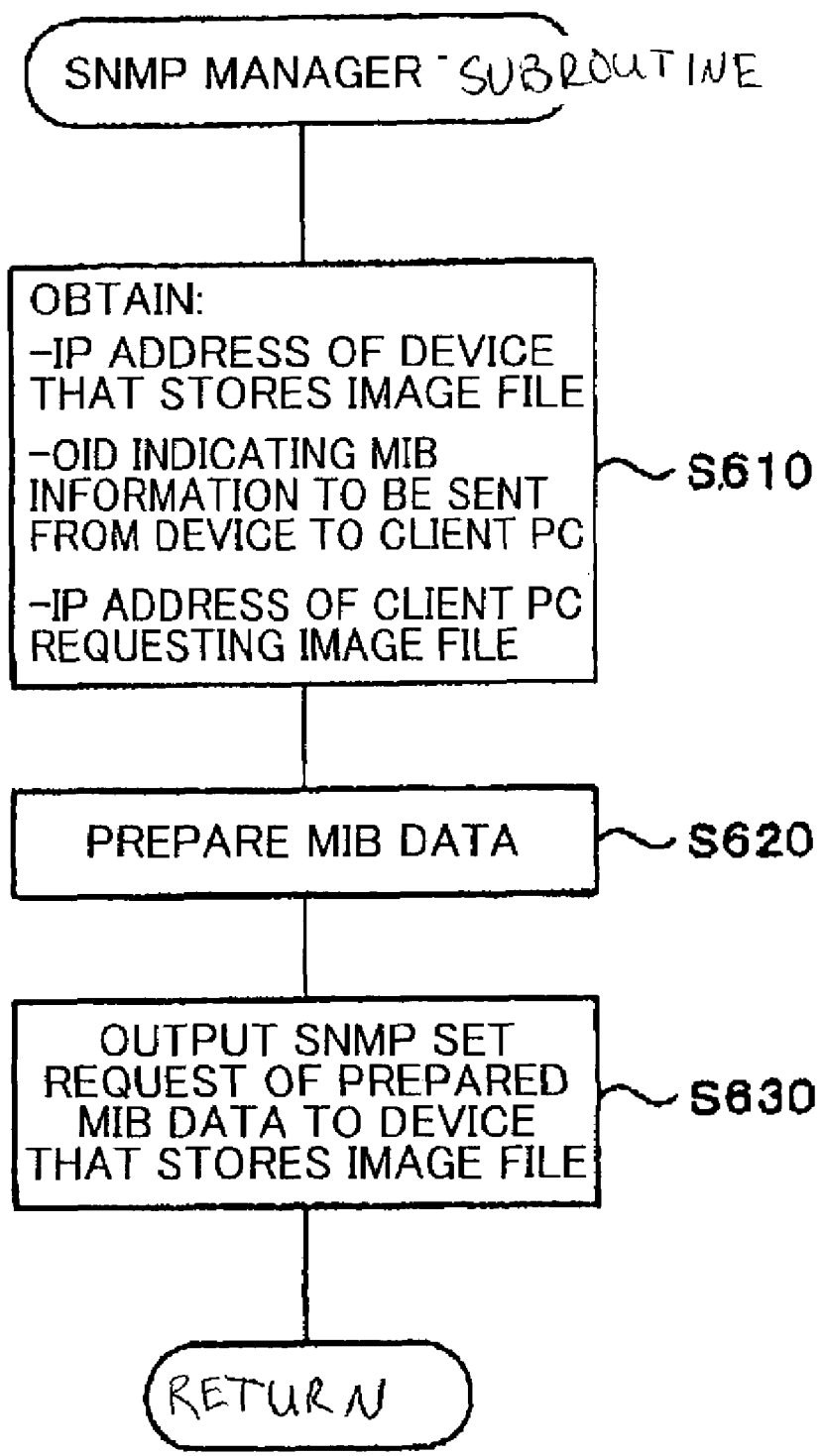
FIG. 14 is a flowchart representing an SNMP manager subroutine started at S560 in the HTTP task shown in FIG. 13.

Then, the SNMP manager routine started up in S560 is as shown in FIG. 14. First, at S610, the above-mentioned 3 types of information that were transferred to the SNMP manager 22 in S560 are obtained. Next, at S620, the MIB data is prepared based on the obtained information. The MIB data contains the IP address of the client personal computer 7, as described above. Then, at S630, the SNMP SET request for the prepared MIB data is sent to the printer that stores the image file.

Figure 15:
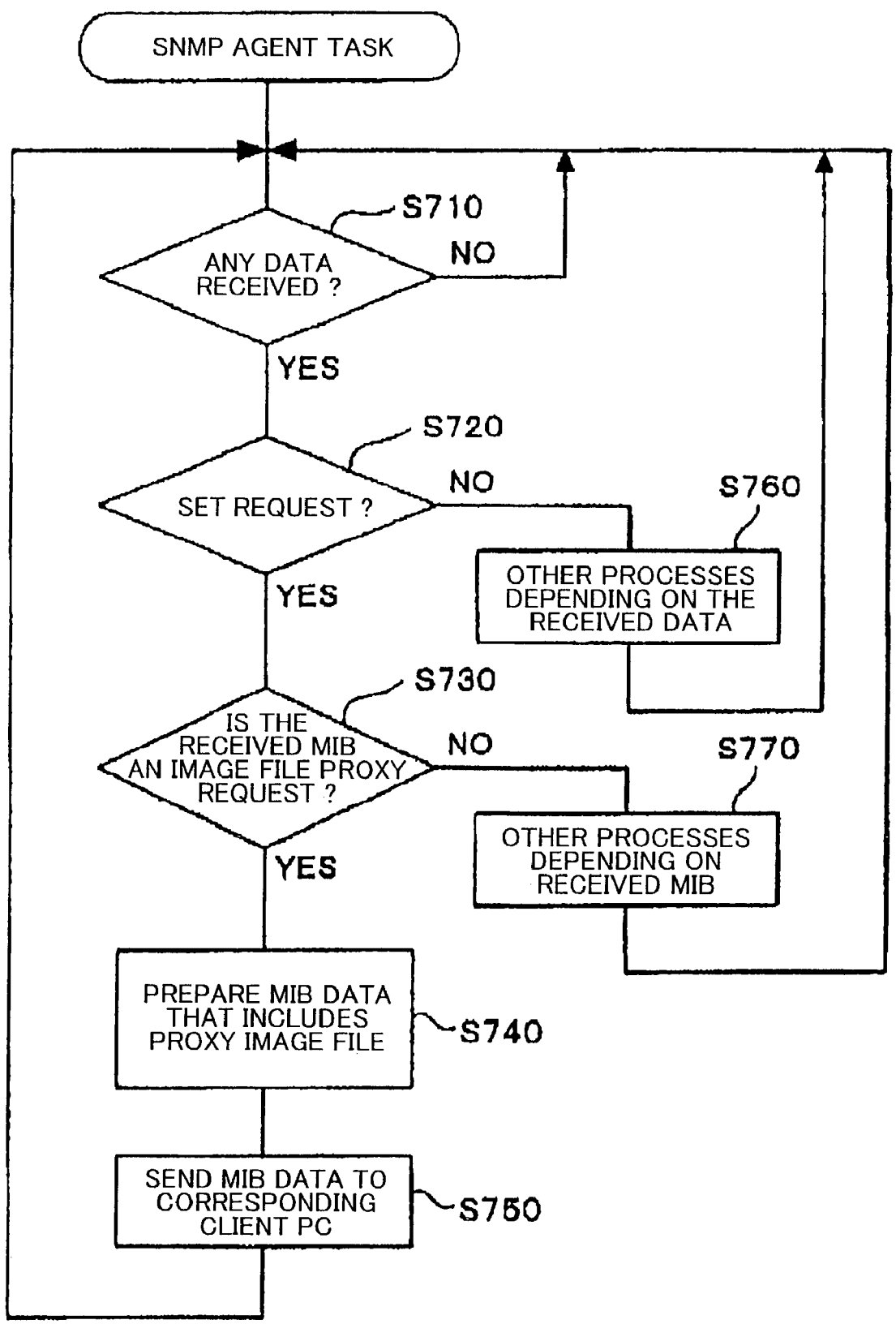
FIG. 15 is a flowchart representing an SNMP agent task executed by the printer according the second embodiment.

On the other hand, the printer that received the SET request executes an SNMP agent task in accordance with the SET request. The SNMP agent task is performed as a function of the SNMP agent 23. Here, the SNMP agent task will be explained with reference to FIG. 15.

When the SNMP agent task is started, first, at S710, the presence/absence of the received data is judged. The judgment at S710 is repeated as long as not data is received. However, when data is received, the program advances to S720, and it is judged whether or not the received data is a SNMP SET request. If not, then the program proceeds to S760 and the process corresponding to the received data is performed. However, when it is the SET request, the program proceeds to S730.

At S730, the received data (the SNMP SET request; MIB) is further judged whether or not it is the request (an image file proxy request) to send the image file to the client personal computer 7. Here, if it is not an image file proxy request, the program proceeds to S770, and the process corresponding to the received MIB data is executed. However, if an image file proxy request was received, the program proceeds to S740.

At S740, the MIB data containing the image file that should be sent as the proxy is prepared, and next, at S750, the MIB data is sent to the client personal computer 7. After that, the program returns again to S710.

As described above, in accordance with the network system of this embodiment, in response to the main page request from the Web browser 31, the printer 1 not only sends the HTML data to the client personal computer 7, but also must send the SNMP SET request to the other printers having the image file that should be sent to the client personal computer 7. Therefore, as compared with the first embodiment, the processing load of the CPU 11 in the printer 1 is slightly greater. Nevertheless, as compared to the conventional case where the printer 1 directly sends all the image files, the processing load is sufficiently reduced.

Moreover, after receiving the HTML data from the printer 1, the client personal computer 7 does not need to perform the image file GET request one by one. Rather, the port 52 is opened and the client personal computer 7 just waits for the image file transmission from the other printers. Therefore, the processing load on the client personal computer 7 is reduced.

Figure 16:
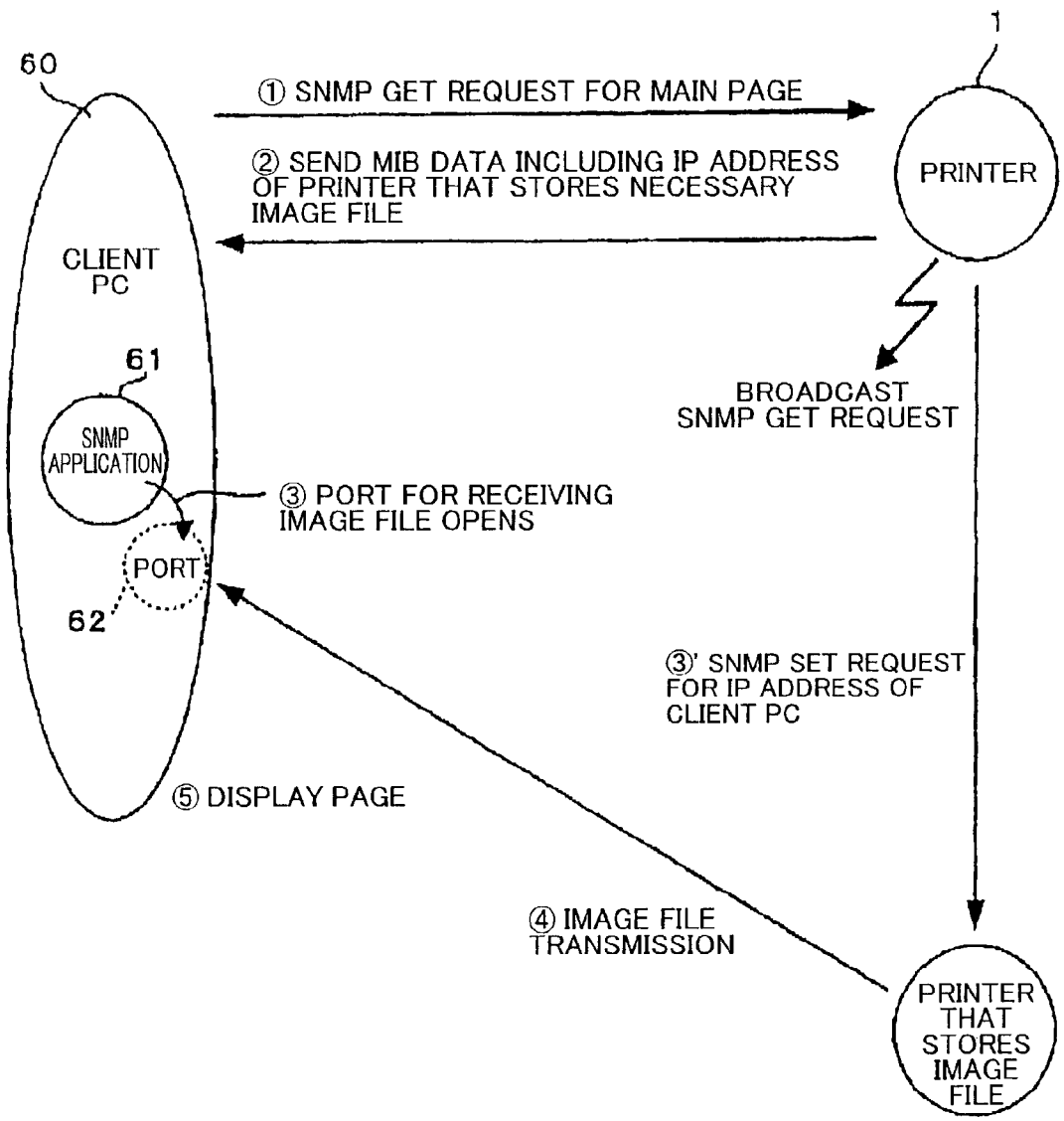
FIG. 16 illustrates flow of data in a network system according to a third embodiment of the present invention.

Next, a third embodiment will be described. FIG. 16 is an explanatory diagram showing an example of a flow of data in accordance with a network system according to this embodiment. The network system of the third embodiment is configured so that a client personal computer 60 manages the printers 1 through 6 using an SNMP application, instead of a Web server as in the second embodiment.

Therefore, the client personal computer 60 of this embodiment is provided with an SNMP application 61 instead of the Web browser 31 provided to the client personal computer 7 in the first and second embodiments. The SNMP application 61 transmits a main page GET request to the printer 1 using SNMP (①), and the SNMP agent 23 of the printer 1 that received the request sends MIB data to the client personal computer 60. The MIB data includes the IP addresses of printers that store image files for displaying the requested main page (②).

Note that the printers 1 through 6 are the same as the printers 1 through 6 in the second embodiment. Therefore, the printers 1 through 6 each execute the polling task of FIG. 8, execute the IP address list preparation process of FIG. 9, and broadcast the SNMP GET request to thereby obtain the information of the other printers as shown in FIG. 5, all in the manner described for the first and second embodiments. The printers 1 through 6 will be explained with the printer 1 as a representative example.

At the client personal computer 60 that received the MIB data from the printer 1, the SNMP application 61 examines whether or not the IP addresses of the other printers are in the MIB data, and if they are, it opens the port 62 and waits for the image files to be transmitted from the printers (③).

On the other hand, the printer 1 sends the MIB containing the IP address of the client personal computer 60 to the other printers having the image file via the SNMP (③). More specifically, this MIB transmission is an SNMP SET request to instruct to send the image file to the client personal computer 60. Then, the printer that received the SET request examines the MIB to thereby send the image file to the designated address (the client personal computer 60) (④). The client personal computer 60 receives the transmitted image file at the port 62, and displays the image file (⑤).

Figure 17:
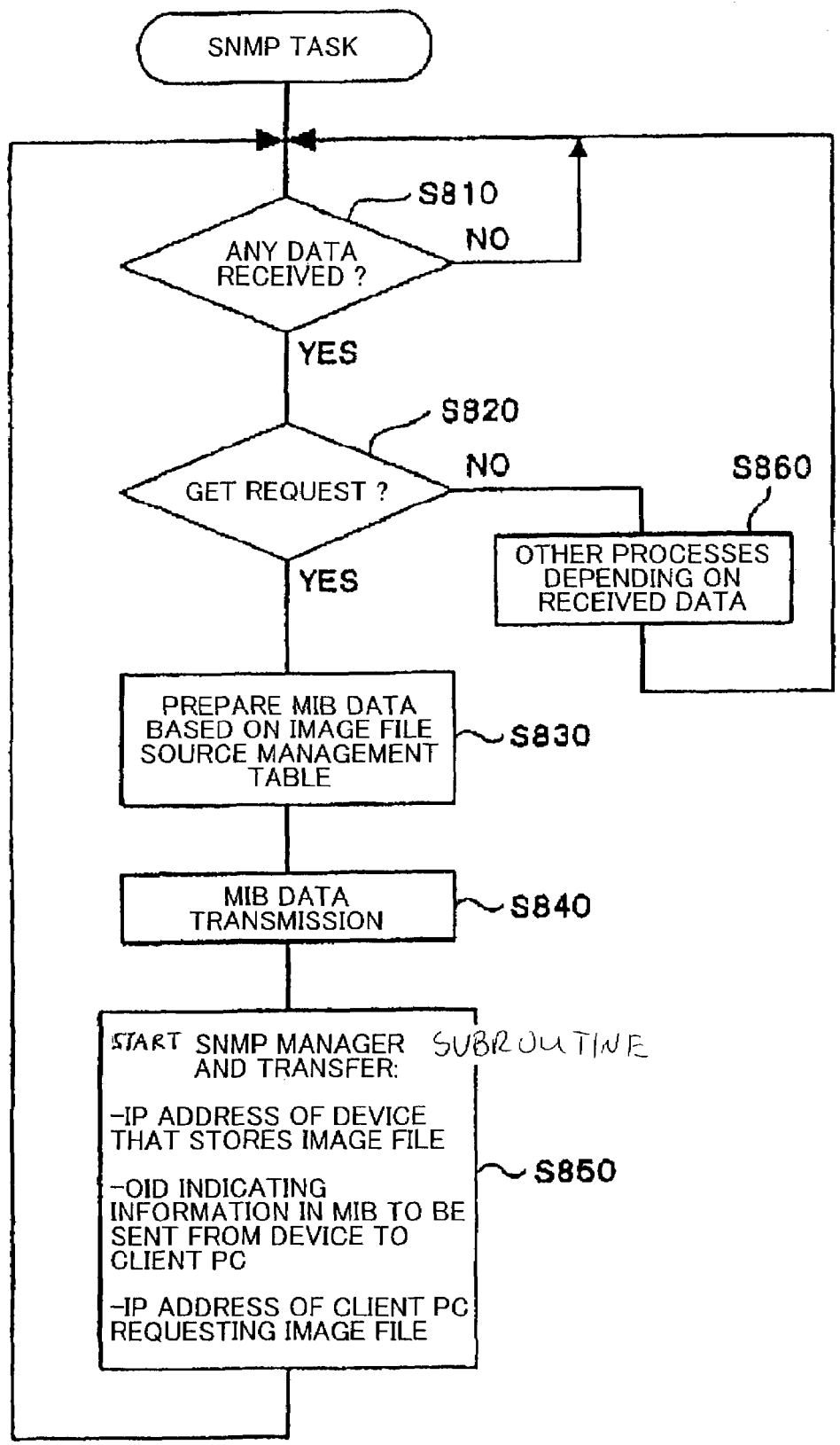
FIG. 17 is a flowchart representing an SNMP task executed by a printer according to a third embodiment.

Next, an SNMP task will be described with reference to FIG. 17. The SNMP task is performed when a SNMP GET request is received from the SNMP application 61 of the client personal computer 60. The printer 1 executes the SNMP task in parallel with the polling task represented by the flowchart of FIG. 8.

When the SNMP task is started, first, at S810, the presence/absence of the received data is judged, and while the data is not received, the S810 judgment process is repeated. However, when the data has been received, the program advances to S820, and it is judged whether or not the data is the SNMP GET request.

Here, when it is not a GET request, the program advances to S860, the process corresponding to the received data is executed, and the program returns again to S810. However, when it is a GET request, the program advances to S830. At S830, the preparation of the MIB data is performed based on the image file source management table 26. In other words, the SNMP agent 23 in the printer 1 prepares the MIB data containing the IP address of the other printers having the image file requested by the requested client personal computer 60.

After the MIB data preparation, at S840 the MIB data is sent to the client personal computer 60. Further, in a manner the same as S560 in the HTTP task in FIG. 13 explained in the second embodiment, at S850 the SNMP manager 22 starts up the SNMP manager subroutine, and the IP address of the device (the printer) having the image file, the OID of the MIB that should be sent from the printer with that IP address to the client personal computer 60, and the IP address of the client personal computer 60 requesting that image file are transferred to the SNMP manager 22. After that, the program returns again to S810.

Note that the SNMP manager subroutine started up in S850 is a process similar to the SNMP manager subroutine in FIG. 14 explained in the second embodiment. Also, the SNMP agent process that is executed by any of the printers that received the MIB data prepared and outputted by the SNMP manager subroutine is substantially the same as the SNMP agent task in FIG. 15 explained in the second embodiment.

In accordance with the above-mentioned network system of this embodiment as well, the processing load on the printer can be sufficiently reduced, and the processing load on the client personal computer 60 can be reduced as well, similarly to the network system of the second embodiment.

While some exemplary embodiments of this invention have been described in detail, those skilled in the art will recognize that there are many possible modifications and variations which may be made in these exemplary embodiments while yet retaining many of the novel features and advantages of the invention.

Figure 18:
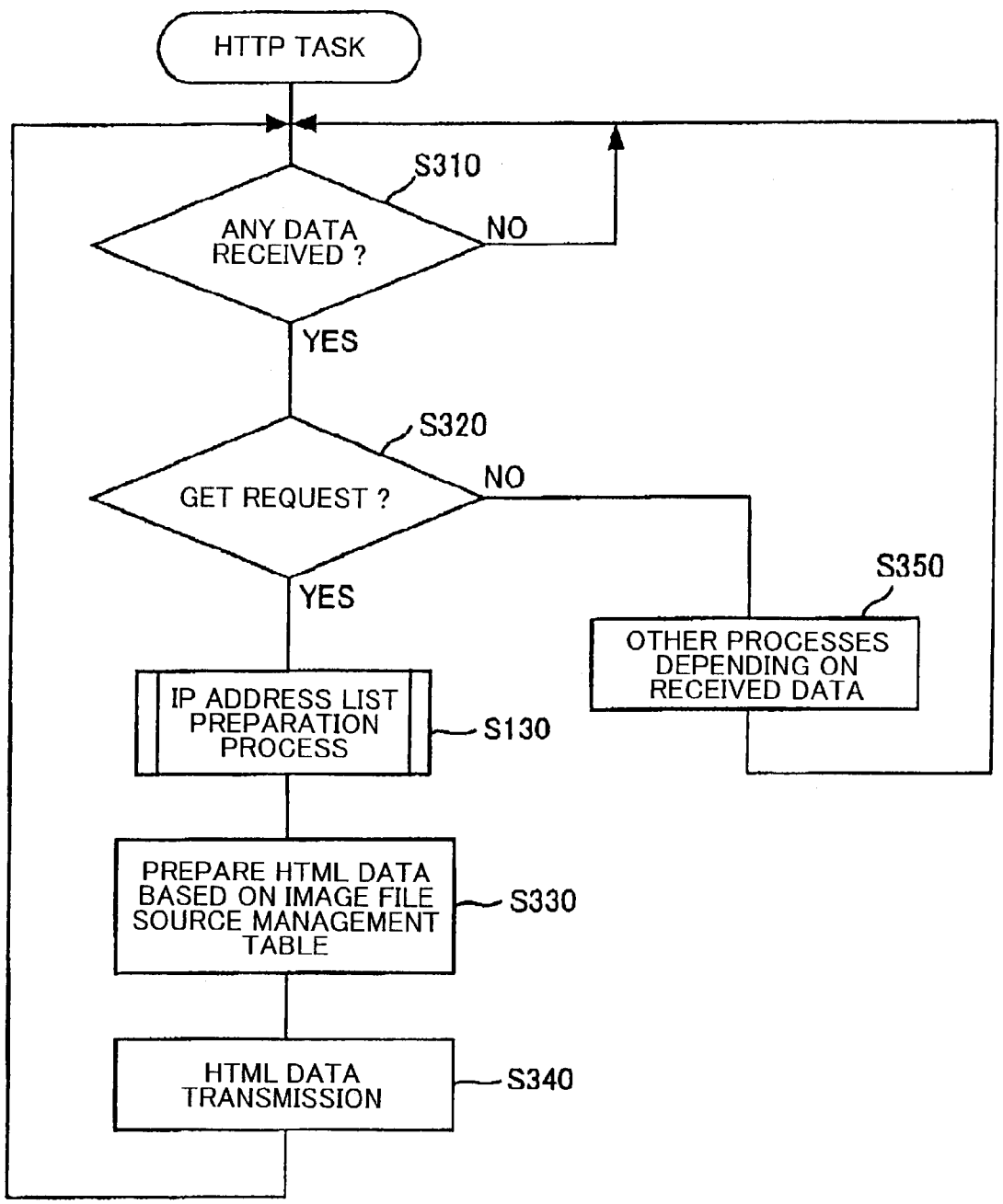
FIG. 18 is a flowchart representing an HTTP task executed by a printer according to a modification of the embodiments.

For example, the first embodiment describes the process for preparing the IP address list in the image file source management table 26 being performed at a predetermined timing by the polling task of FIG. 8. However, the process for preparing the IP address list may be executed when the main page GET request is sent from the Web browser 31. In this case, the polling task of FIG. 8 can be dispensed with. Instead, as shown in FIG. 18, the IP address list preparation process from S130 of the polling task of FIG. 8 is executed between S320 and S330 in the HTTP task of FIG. 10.

Because the printer 1 investigates data stored in the other printers 2 to 6 when the printer 1 receives a data request from the client personal computer 7, the printer 1 operates based on the most up-to-date condition the time of the data request. Therefore, the load-distributing operation of the printers 1 to 6 is more reliably performed, so that the client personal computer 7 more reliably receives the desired image files.

It should be noted that the IP address list preparation process similar to that of S130 in FIG. 8 may be added to either the systems of the second or the third embodiments. In the case of the second embodiment, the IP address list preparation process may be executed between S520 (after an affirmative determination at S520) and S530 in the HTTP task of FIG. 13. In the case of the third embodiment, the IP address list preparation process may be executed between S820 (after an affirmative determination at S820) and S830 in the SNMP task of FIG. 17.

According to this configuration, in either case, the latest image source in the network system is searched just at the time of receiving the data request from the client personal computer. Therefore, processes are not performed to obtain image files from an image source printer that is not turned on, so that the client personal computer can more reliably obtain image files from designated image source printers.

Further, in the HTTP task of FIG. 18, the IP address list preparation process being executed in S130 unconditionally whenever a GET request is received from the Web browser 31. However, the HTTP task can be modified so that the IP address list preparation process (S130) is only executed when the Web browser 31 sends a GET request for the same page twice within a predetermined period.

Figure 19:
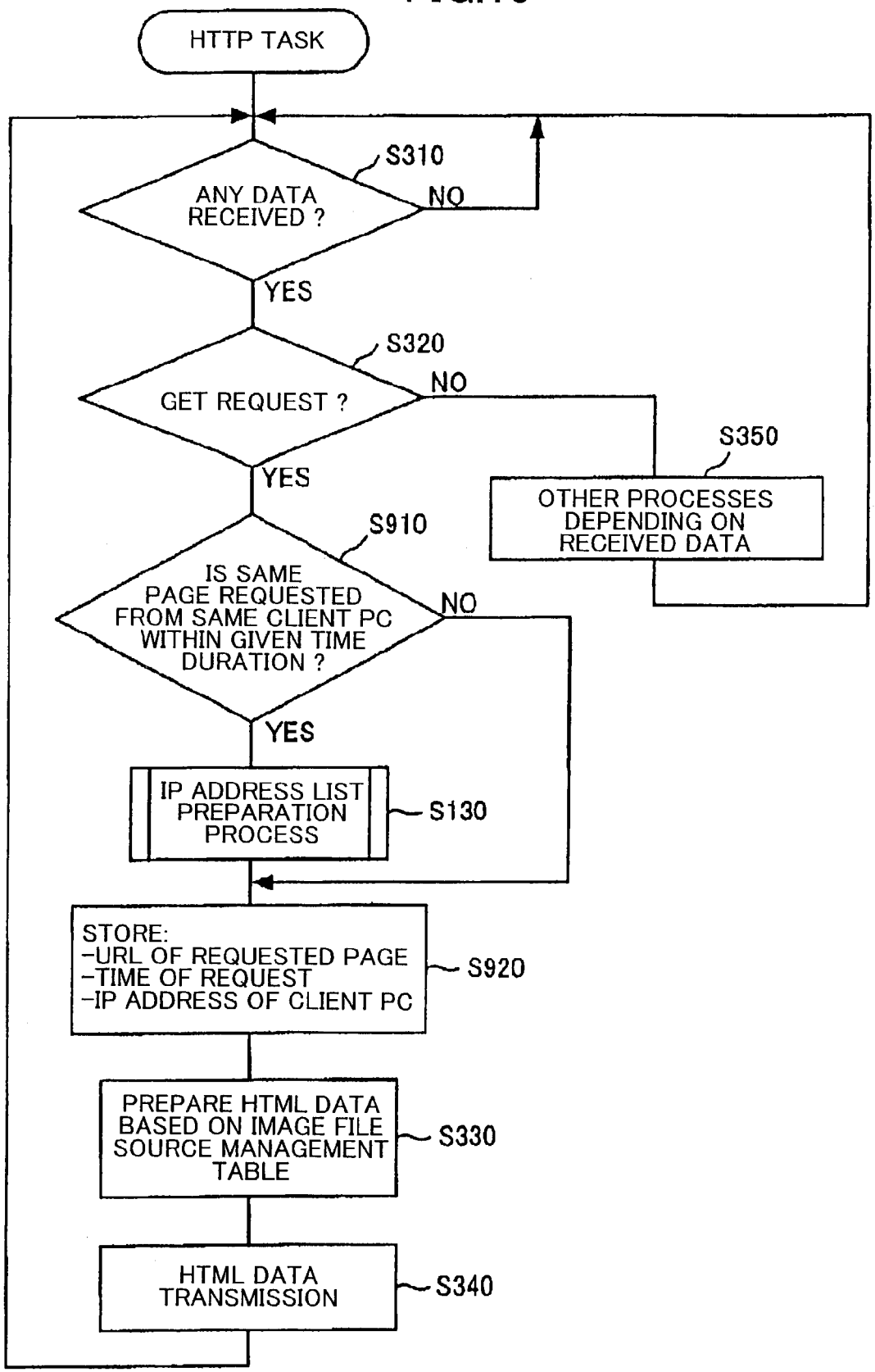
FIG. 19 is a flowchart representing an HTTP task executed by a printer according to yet another modification of the embodiments.

This modification is shown in FIG. 19. As shown, the HTTP task of FIG. 18 is modified by adding S910 between S320 (after an affirmative determination in S320) and S130 and S920 between S130 and S330. In S910, a GET request packet from S320 is analyzed to determine the IP address of the client personal computer that sent a GET request and the URL of the page that is the subject of a GET request. Also, in S910, three conditions are judged. First, it is judged whether or not a GET request was received previously for the same page as requested in this GET request. If so, then it is judged whether or not the previous Get request was received from the same client personal computer, that is, the same Web browser 31. If so, then it is judged whether the present Get request was received within a predetermined time duration of, for example, 30 seconds, since the previous GET request for requesting the same page was received.

Then, when all three conditions are met, that is, when it is judged in S910 that the current GET request is for requesting the same page as the previous GET request and is received from the same client personal computer within the predetermined time duration since the previous GET request for requesting the same page was received (S910: YES), then the same IP address list preparation process as in S130 is performed and the program advances to S920. On the other hand, if any one of the three conditions is not met (S910: NO), the program advances to S920 without performing S130. At S920, the URL of the requested page, the time that the present GET request was received, and the IP address of the client personal computer that sent a GET request are stored into the RAM 13. Then the program advances to S330. It should be noted that the judgments made in S910 for the three conditions are based on the information stored previously in S920.

With this configuration, the most up-to-date image sources in the network system is investigated only when the same page is requested again from the same client personal computer within the predetermined time duration since the previous data transmission. In other words, when the same page is requested the second time from the same client personal computer within the predetermined time duration, it is imagined that the Web browser 31 has tried to obtain the image file from the image source printer based on the HTML data obtained in response to the previous GET request, but failed to obtain the image file because the printer is not turned on, and as a result, the page could not be displayed properly, and a user who has doubted this requests the page again. Therefore, the latest image source in the network system is searched only when it is very necessary as described above, whereby the more efficient system can be constructed.

Further, the above-mentioned embodiments describe printers as examples of devices that are connected to the network 8 other than the client personal computer. However, it goes without saying that the present invention is not limited whatsoever to printers. For example, the present invention can be applied to all types of devices, such as routers and various peripheral devices, that can be connected to a network. Further, printing devices are not limited to printers, either. The present invention can be applied to a copier, a multi-function peripheral device or other device having a printing function.

Further, the embodiments describe distributing image sources (the transmission sources) of image files used in the main page shown in FIG. 1 for a printer management setting screen amongst the printers using HTTP or SNMP. However, the present invention is not restricted to image files, and therefore not restricted to HTTP and SNMP. Any type of data can be similarly distributed using any type of protocol.

Moreover, the embodiments describe the printer 1 using a broadcast message to obtain the three types of information ① through ③ shown in FIG. 5. However, the present invention is not limited to this. For example, the printer 1 need only obtain the model name of the other printers 2 to 6. Then, by comparing the model name(s) of the other printers 2 to 6 to a buffer or other memory that stores the model name of the printer 1, the printer 1 can investigate whether or not any printers with the same model as the printer 1 exists among the printers connected to the network 8. If one of the other printers 2 to 6 has the same model name as the printer 1, then it can be assumed that the other printer stores the same image data as the printer 1. Therefore, the printer 1 registers the printer(s) that has the same model name. Then, when the printer 1 receives a data request from the Web browser (or the SNMP application as in the third embodiment) and the printer 1 judges that the data request is for image files that the printer 1 itself stores, such as image files for displaying the main page, the printer 1 designates the registered printer with the same model name as the image source for the image files. In this way, by using the broadcast to investigate simply whether or not there is a printer with the same model name as the target printer itself, the processing load on the printer 1 incurred by the broadcast is reduced.

Further, in the polling task in FIG. 8, the IP address list preparation process in S130 is executed only when either the processing load amount of the printer 1 itself is small or the load on the network 8 is small (S120: YES). However, the present invention is not limited to this. For example, instead of the judgment process of S120, judgment processes S1010 and S1030 shown in FIG. 20 may be performed.

In other words, in accordance with the polling task in FIG. 8, the IP address list preparation process in S130 is executed only when either the processing load amount of the printer 1 itself is small or the load on the network 8 is small (S120: YES). However, in accordance with the polling task of FIG. 20, the IP address list preparation process in S130 is executed only when the printer 1 itself newly joins the network, that is, when the printer 1 changes from a state where it cannot communicate with the other apparatuses connected to the network to a state where it can communicate with the other apparatuses connected to the network, or when it receives a notification from the other printers 2 through 6 that they have joined the network.

Figure 20:
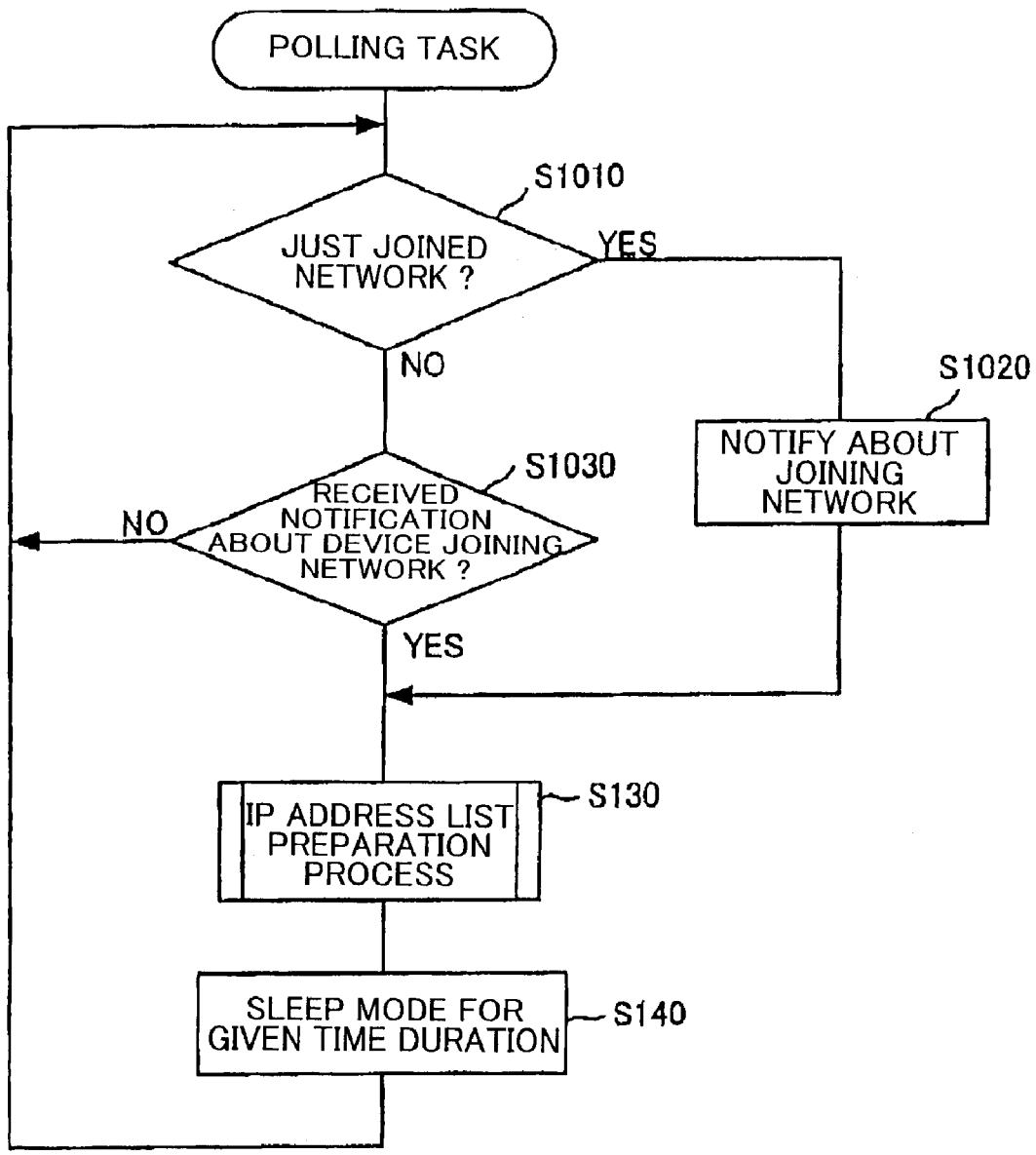
FIG. 20 is a flowchart representing a polling task executed by a printer according to another modification of the embodiments.

In other words, as shown in FIG. 20, at S1010, it is judged whether or not the printer 1 itself has newly joined the network 8, namely, whether or not it has changed from a state incapable of communication with the apparatuses connected to the network, to a state capable of communication with the apparatuses connected to the network. This judgment is performed by judging whether or not the printer 1 changes from a status where it cannot collect packets flowing through the network, to a status where it can collect the packets. As a result of this judgment, when it is judged that the printer 1 has newly joined the network 8, the program advances to S1020, and after performing a notification to the printers 2 through 6 that the printer 1 has joined the network 8, the above-mentioned IP address list preparation process (S130) is performed. Further, when as a result of the judgment at S1010, it is judged that the printer 1 has not newly joined the network 8, for example because it was judged previously in S1010 that the printer 1 joined the network 8 and the printer 1 has remained joined to the network 8 since then, the program advances to S1030, and it is judged whether or not the above-mentioned notification based on S1020 is received from the printers 2 through 6. In other words, it is judged whether or not a printer has newly joined the network 8. Then, at S1030, when it is judged that there is a newly-joined printer, the program advances to S130, and the above-mentioned IP address list preparation process is performed. On the other hand, when it is judged that there is no newly-joined printer on the network 8, the program returns to S1010.

According to this configuration, when the printer itself newly joins the network and a printer other than the printer 1 newly joins the network, the most recent status of image sources in the network system are searched. Therefore, when the printer 1 newly joins another network, the image source corresponding to the newly joined network can be determined immediately. This is extremely desirable. Further, when the other printer is newly joined to the network, the image source corresponding to a change in the network environment can be determined immediately. This is extremely desirable. Note that it goes without saying that at least one of the judgment process at S1010 (and the process at S1020) and the judgment process at S1030 may be omitted.

Further, the embodiments describe the IP address list preparation process of S130 being executed only during the polling task shown in FIG. 8 or in FIG. 20. However, the IP address list preparation process of S130 can additionally be performed in a second polling task shown in FIG. 21. That is, the second polling task is executed in addition to the polling task shown in FIG. 8 or in FIG. 20, so that the IP address list preparation process of S130 is executed during the two different polling tasks.

Figure 21:
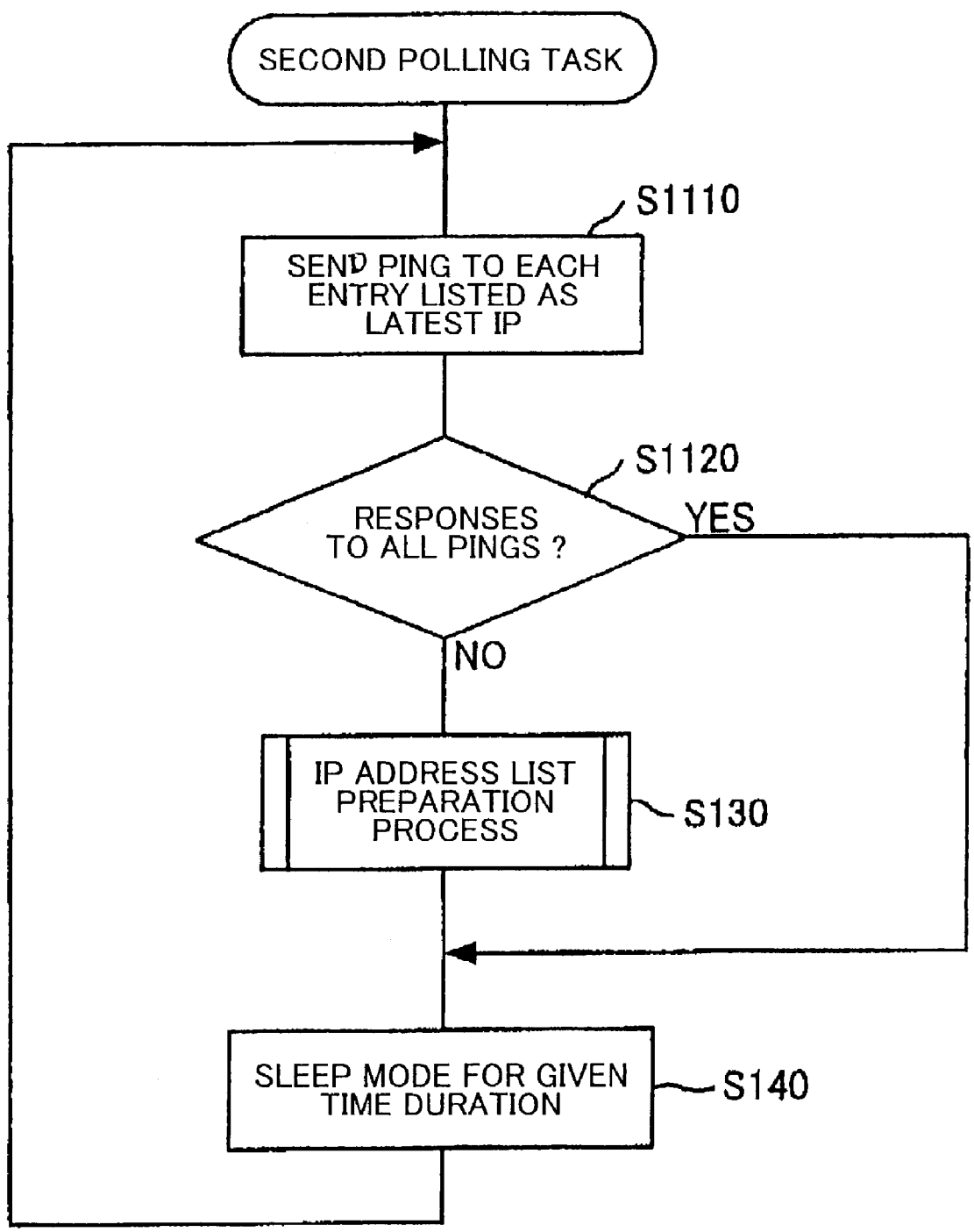
FIG. 21 is a flowchart representing a second polling task executed by a printer according to yet another modification of the embodiments.

As shown in FIG. 21, when the IP address list preparation process (S130) is executed based on the second polling task, then at S1110, a PING (packet internet groper) is sent individually to all the IP addresses in the Latest IP column in the image file source management table 26. Note that according to TCP/IP, "PING" is the name of a command for learning the status of a partner node. Internet control message protocol (ICMP) is used to send an echo request to the partner node, and if there is a response to the echo request, then it is judged that communication with the partner node can be properly performed.

Then, after executing the PING at S1110, at S1120, it is judged whether or not the responses to all the PINGs executed at S1110 could be confirmed. As a result, when the responses to all the PINGs could be confirmed, the program advances to S140 (since the process is equivalent to that in S140 shown in FIG. 8, explanation is given using the same reference numerals), and when the responses to all the PINGs could not be confirmed, the program advances to S130 (since the process is identical to that in S130 shown in FIG. 8, explanation is given using the same reference numerals). After performing the above-mentioned IP address list preparation process in S130, the program advances to S140, whereupon a sleep mode is entered for a predetermined time duration of 10 minutes. Then, the program returns to S1110.

With this configuration, the PING is transmitted to the Latest IPs, which were set as the image sources for the image data during the load distribution algorithm shown in FIG. 11. When communication is not possible with a printer at a IP address indicated in the Latest IP column (S1120: NO), then the IP address list preparation process of S130 is executed so that a properly updated image file source management table 26 is prepared in S270. Because the image file source management table 26 will include no Latest IP at this point (S420: NO), it is less likely that an incommunicable printer will be designated as the image source for the image file during the load distribution algorithm of FIG. 11. Note that the PING may be transmitted to all the IP addresses in the image file source management table 26, not just to the Latest Ips as in this example. However, as the number of PING targets increases, the processing load becomes greater. Therefore, it is desirable to transmits PINGs to only the IP address in the Latest IP column.

Figure 9:
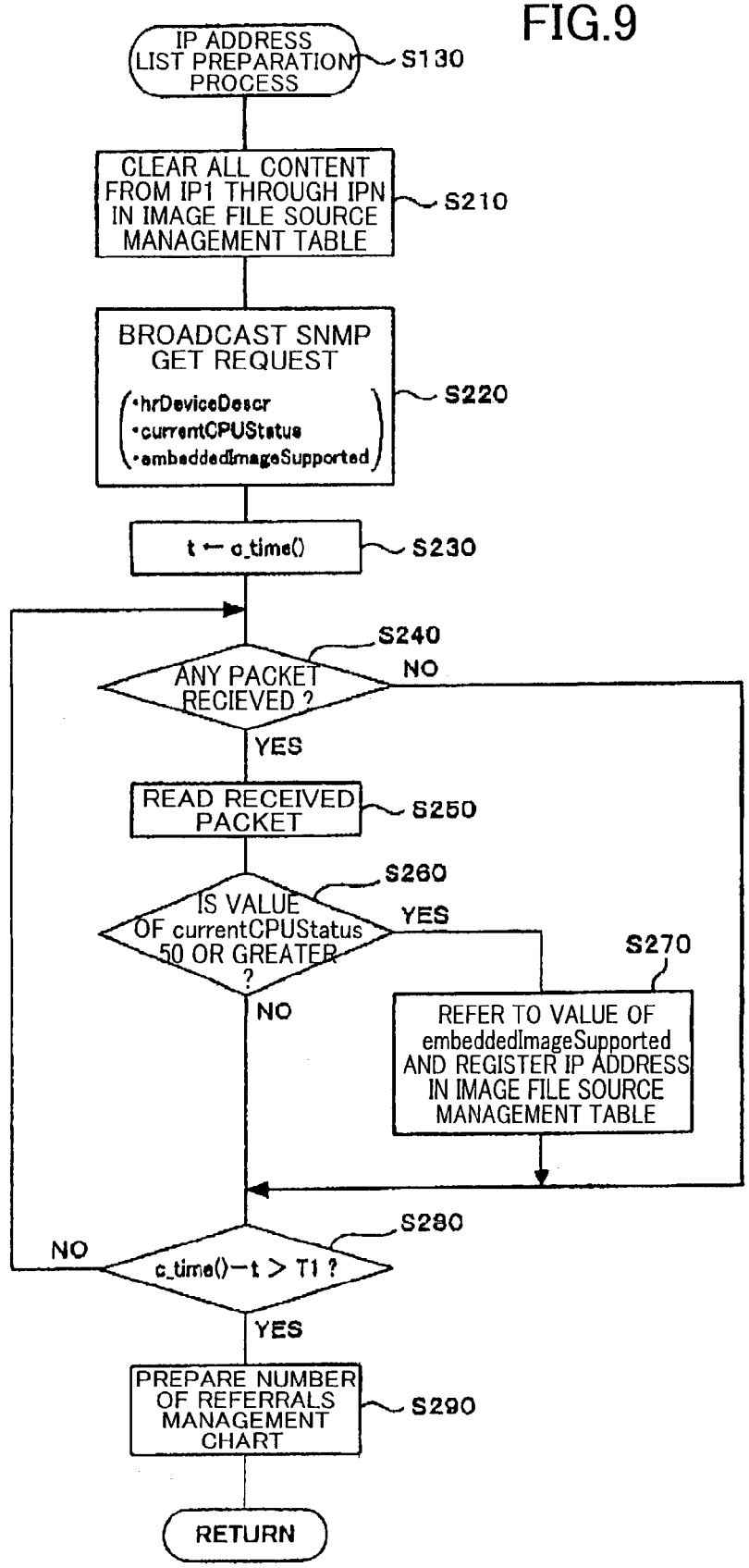
FIG. 9 is a flowchart representing an IP address list preparation process performed at S130 of the polling task shown in FIG. 8.

Further, during the IP address list preparation process of FIG. 9, IP addresses of all printers that have a relatively small processing load amounts are registered unconditionally into the image file source management table 26 (S260: YES, S270). However, the IP address list preparation process can be modified as shown in FIG. 22 so that the user can designate in advance which printers can be registered as image sources in the image file source management table 26.

Figure 22:
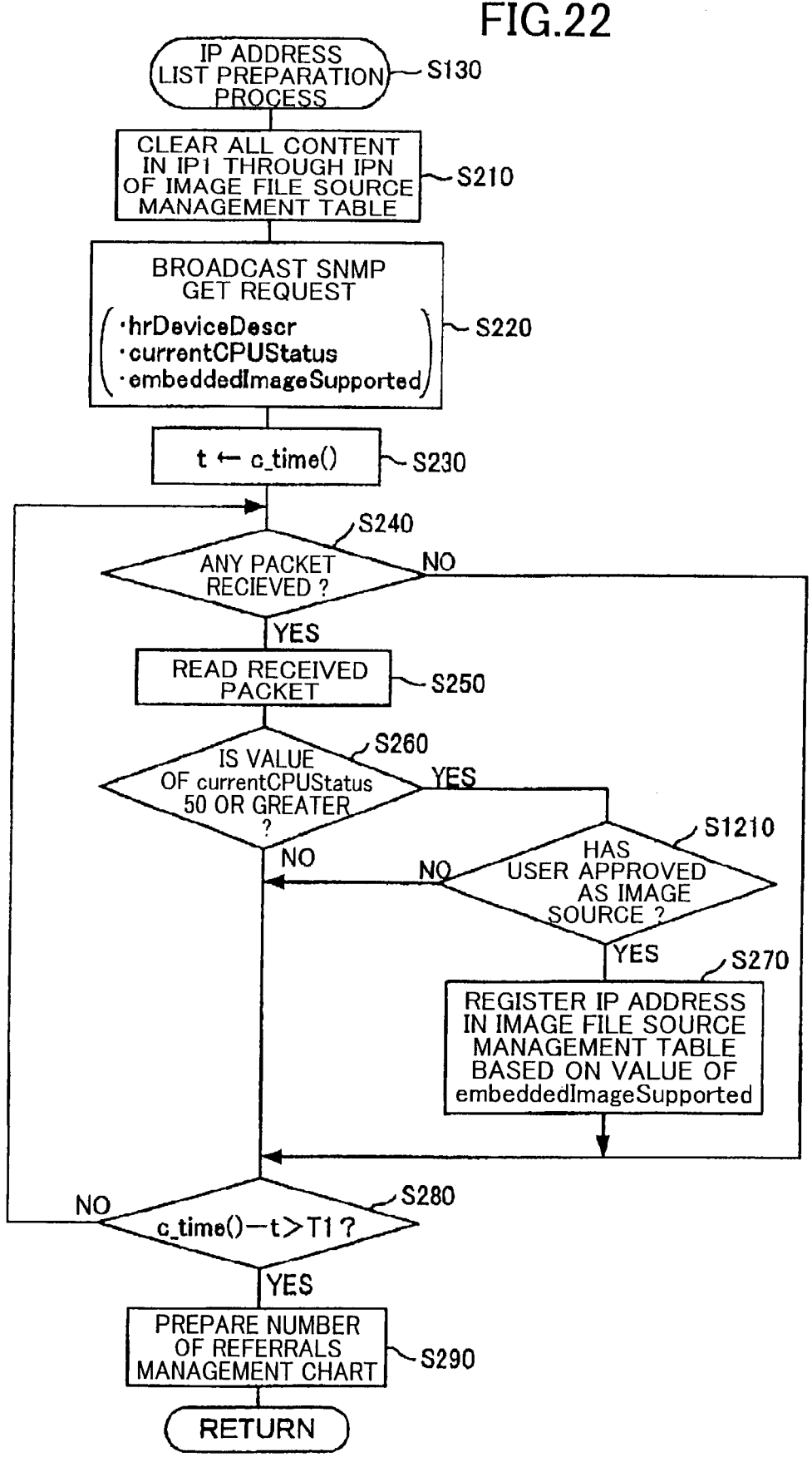
FIG. 22 is a flowchart representing IP address list preparation process executed by a printer according to yet another modification of the embodiments.

As shown in FIG. 22, a new S1210 is performed between S260 (after an affirmative determination at S260) and S270 in the IP address list preparation process in FIG. 9. During S1210, it is judged whether or not the IP address of the printer that was determined to have a relatively small processing load amount in S260 is one that the user approved in advance for registration as an image source. If so (S1210: YES), then the program advances to S270, and if not (S1210: NO), then the program advances to S280.

Figure 23:
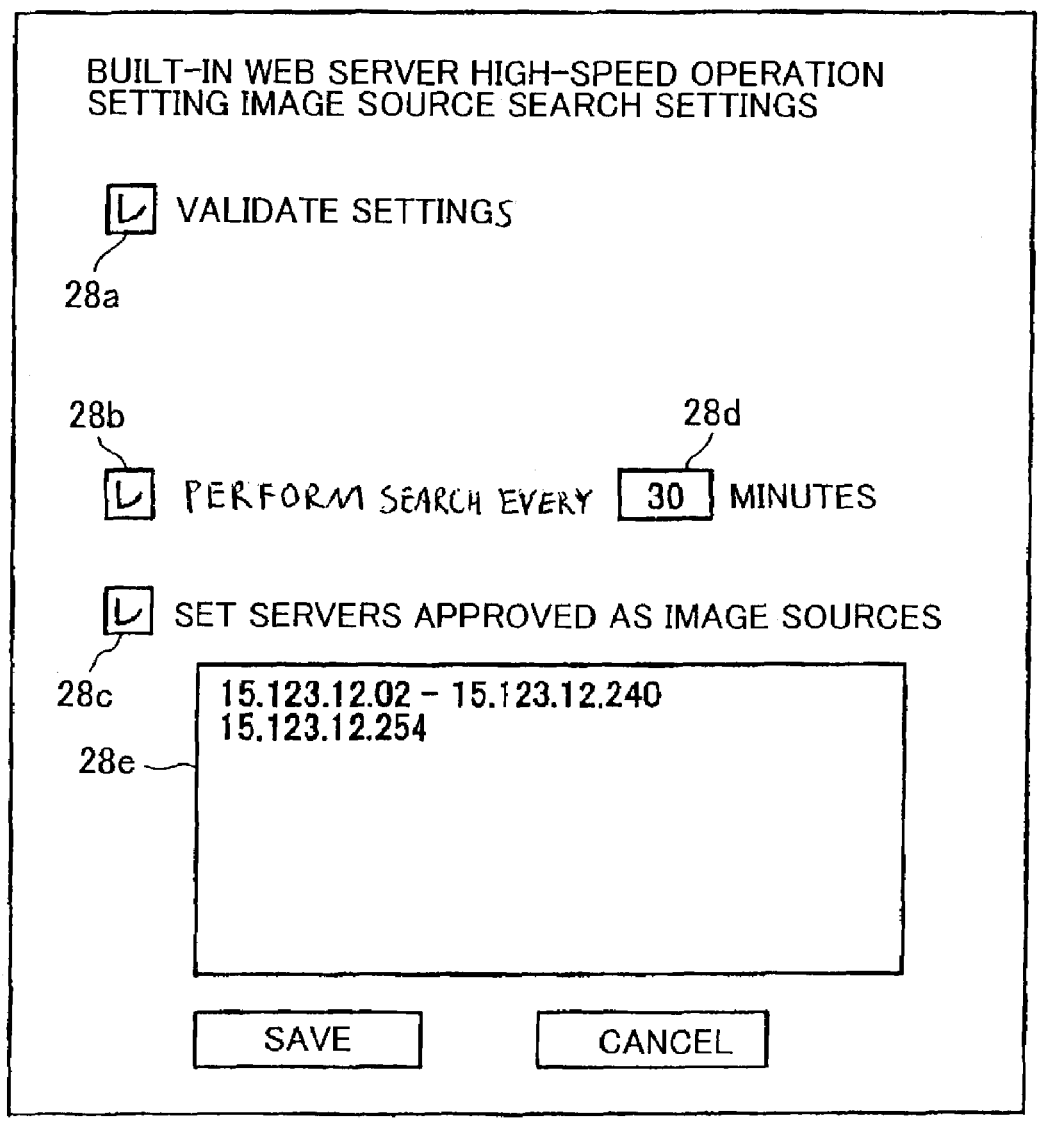
FIG. 23 is a diagram showing an example of a user interface.

Note that IP addresses that the user approves in advance for registration as an image source can be registered through a user interface, such as that shown in FIG. 23. That is, the user uses the Web browser 31 of the personal computer 7 is used to obtain data for displaying the Web page 28 from the database 14 of the printer 1. The Web page 28 includes three check boxes 28a, 28b, and 28c. The check box 28a is for validating settings. The check box 28b is for validating periodic searches. The check box 28c is for setting servers that the user approves for use as image sources. The user uses a mouse (not shown) of the personal computer 7 to move a cursor onto a desired one of three displayed check boxes 28a to 28c and click on the check box. In the example of FIG. 23, all three of the check boxes 28a to 28c are validated. When the "VALIDATE SETTINGS" check 28a box is checked, the load distribution system of the embodiments is executed. When the "VALIDATE PERIODIC SEARCHES" check box 28b is checked, the IP address list preparation process (S130) is executed each time a time duration inputted into a time field 28d to the right of the check box 28b elapses. This periodic search is performed in addition to the IP address list preparation process (S130) based on the polling tasks shown in FIGS. 8, 20, and 21. When the "SET SERVERS APPROVED AS IMAGE SOURCES" check box 28c is checked, the judgment process in S1210 shown in FIG. 22 is validated and the IP addresses inputted into a field 28e are used in the judgment of S1210. Note that the user can input a pin-point designation, such as "15.123.12.254", a range designation indicating a starting point and an ending point, such as "15.123.12.02-15.123.12.240", or both in the field 28e.

Further, in accordance with the above-mentioned embodiments, it has been explained that various programs for making the printer 1 function as the server (the load distribution server) of the present invention are stored in the ROM 12. However, these various programs may be recorded on a floppy disk (registered trademark), a magneto-optical disk, a CD-ROM, a hard disk and other such various storage devices (computer readable recording media).

In this case, by loading the program recorded on the recording medium onto the computer system and starting it as needed, the server of the present invention can be achieved in the computer system.

Further, the program can also be installed into the computer via a communications line. In this case, the program transmitted via the communications line is considered a program.

What is claimed is:

1. A client-server system connected to a network, the system comprising:

a client that is a personal computer connected to the network, the client sending a data request requesting page data over the network, the page data comprising first partial data and second partial data;

a first printer including a data-providing server that is a web server connected to the client by the network and stores-is configured to store the first partial data; and a second printer including an assisted server that is a web server connected to the client and the data-providing server by the network and stores the first partial data and the second partial data, the second partial data including designation data indicating one of the assisted server and the data-providing server the assisted server receiving the data request from the client over the network and providing the client with the second partial data, the assisted server stores inquiring regarding the first partial data stored in the data-providing server by using a broadcast via the network, and the data-providing server providing identical data to the assisted server upon receiving the inquiry from the assisted server;

wherein, when the identical data indicates the first partial data, the assisted server creates the second partial data and provides the second partial data to the client, the second partial data including the designation data indicating the data-providing server;

wherein, when the identical data does not indicate the first partial data, the assisted server creates the second partial data and provides the second partial data to the client, the second partial data including the designation data indicating the assisted server;

wherein the client receives the second partial data from the assisted server and receives the first partial data from one of the assisted server and the data-providing server that is indicated by the designation data included in the second partial data;

wherein the assisted server uses an acquisition command to instruct the client to receive the first partial data from the data-providing server, the acquisition command indicating that the client should obtain the first partial data directly from the data-providing server, the client, upon receiving the acquisition command from the assisted server, sending a data request for the first partial data to the data-providing server, the data-providing server, upon receiving the data request from the client, sending the first partial data to the client.

2. The client-server system as claimed in claim 1, wherein the assisted server again inquires regarding the first partial data stored in the data-providing server each time a predetermined time duration elapses.

3. The client-server system as claimed in claim 1, wherein the assisted server judges whether a processing load of the assisted server is lower than a predetermined low level, the predetermined low level being lower than a predetermined high level, the assisted server inquiring regarding the first partial data stored by the data-providing server if the assisted server judges that the processing load of the assisted server is lower than the predetermined low level.

4. The client-server system as claimed in claim 1, wherein the assisted server judges whether traffic on the network is lower than a predetermined traffic level, the assisted server inquiring regarding the first partial data stored by the data-providing server if the assisted server judges that traffic on the network is lower than the predetermined traffic level.

5. The client-server system as claimed in claim 1, wherein the assisted server judges whether the assisted server has just entered a communicable condition with the data-providing server through the network, the assisted server inquiring regarding the first partial data stored by the data-providing server if the assisted server judges that the assisted server has just entered a communicable condition with the data-providing server.

6. The client-server system as claimed in claim 1, wherein the assisted server judges whether the data-providing server has just entered a communicable condition with the assisted server through the network, the assisted server inquiring regarding the first partial data stored by the data-providing server if the assisted server judges that the data-providing server has just entered a communicable condition with the assisted server.

7. The client-server system as claimed in claim 1, further comprising an other server that stores the first partial data and that is connected to the network, the assisted server judging whether the data-providing server and the other server are communicable servers that remain in a communicable condition with the network, the assisted server inquiring, when the assisted server judges that at least one of the data-providing server and the other server are no longer communicable servers, regarding the first partial data stored in any communicable server amongst the data-providing server and the other server.

8. The client-server system as claimed in claim 1, wherein the assisted server judges whether the assisted server receives the data request from the client and, upon judging that the assisted server has received the data request from the client, inquires regarding the first partial data stored in the data-providing server.

9. The client-server system as claimed in claim 8, further comprising an other client connected to the network, the assisted server, upon receiving an other data request, judges:
   whether the other data request is from the client or from the other the client;
   whether the other data request is for the same page data as requested in the data request; and
   whether the other data request was received within a predetermined time from receipt of the data request;
   the assisted server inquiring regarding the first partial data stored in the data-providing server when the assisted server judges that the other data request is from the client, that the other data request is for the same page data, and that the other data request was received within the predetermined time.

10. The client-server system as claimed in claim 1, wherein the assisted server judges whether a load margin level of the data-providing server is less than a predetermined value, the assisted server, when the assisted server judges that the load margin level of the data-holding server is less than the predetermined value, determining that the data-providing server does not store the first partial data.

11. The client-server system as claimed in claim 1, further comprising a user interface enabling a user to selectively allow the assisted server to instruct the client to receive the first partial data from the data-providing server and prohibit the assisted server from instructing the client to receive the first partial data from the data-providing server, the assisted server instructing the client to receive the first partial data from the data-providing server only when the user, through the user interface, allows the assisted server to instruct the client to receive the first partial data from the data-providing server.

12. The client-server system as claimed in claim 1, wherein the data-providing server stores the first partial data, further comprising:
   an other data-providing server that stores the first partial data, the assisted server instructing the client to receive the first partial data from one of the data-providing server and the other data-providing server; and
   a memory that stores data indicating, as a previously referred server, the one of the data-providing server and the other data-providing server that the assisted server instructed the client to receive the first partial data from, the client sending another data request for the first partial data over the network, the assisted server receiving the other data request and instructing the client to receive the first partial data from the previously referred server indicated by the data stored in the memory.

13. The client-server system as claimed in claim 1, further comprising an other server that stores the first partial data and that is connected to the network, the assisted server also judging inquiring regarding the first partial data stored in the other server, the assisted server judging whether the other server stores the first partial data requested by the client and, upon judging that the other server stores the first partial data, instructing the client to receive the first partial data from the other server instead of the assisted server providing the first partial data to the client.

14. The client-server system as claimed in claim 1, further comprising a memory, the assisted server storing, in the memory, data that represents the first partial data stored in the data-providing server, the assisted server referring to the memory to judge whether the data-providing server stores the first partial data requested by the client and, upon judging that the data-providing server stores the first partial data, instructing the client to receive the first partial data from the data-providing server.

15. The client-server system as claimed in claim 14, further comprising a peripheral apparatus connected to the network, the assisted server being incorporated in the peripheral apparatus to enable the peripheral apparatus to send information about the peripheral apparatus to the client via the assisted server.

16. The client-server system as claimed in claim 15, further comprising a type-storing memory that stores a type of the peripheral apparatus, the assisted server further judging a type of the data-providing server and judging whether the type of the data-providing server is the same as the type of the peripheral apparatus, the type-storing memory, when the assisted server judges that the type of the data-providing server is the same as the type of the peripheral apparatus, storing data indicating that the data-providing server stores the same data as the peripheral apparatus, the assisted server, upon receiving the data request from the client device, judging whether the data request is for data that the peripheral apparatus stores and, if the data request is for data that the peripheral apparatus stores and the type-storing memory stores the data indicating that the data-providing server stores the same data as the peripheral apparatus, instructing the client to receive the first partial data from the data-providing server.

17. The client-server system as claimed in claim 1, further comprising an other data-providing server that stores the first partial data, wherein the assisted server instructs the client to receive the first partial data from either one of the data-providing server and the an other data-providing server, wherein the second partial data includes data indicating the one of the data-providing server and the an other data-providing server that the assisted server instructs the client to receive the first partial data from, and the client receives the first partial data from the one of the data-providing server and the an other data-providing server that is indicated by the data of the second partial data.

18. The client-server system as claimed in claim 1, wherein the first partial data is image data, and the second partial data is HTML data.

19. The client-server system as claimed in claim 1, wherein the assisted server requests the data-providing server to provide data indicating the first partial data stored in the data-providing server, and determines that the data-providing server stores the first partial data when the data provided from the data-providing server is in coincidence with data indicating the first partial data stored in the assisted server.

20. A client-server system connected to a network, the system comprising:
 a client that is a personal computer connected to the network, the client sending a data request requesting page data over the network, the page data comprising first partial data and second partial data;
 a first printer including a data-providing server that is a web server connected to the client by the network and stores- is configured to store the first partial data; and
 a second printer including an assisted server that is a web server connected to the client and the data-providing server by the network and stores the first partial data and the second partial data, the second partial data including designation data indicating one of the assisted server and the data-providing server the assisted server receiving the data request from the client over the network and providing the client with the second partial data, the assisted server stores inquiring regarding the first partial data stored in the data-providing server by using a broadcast via the network, and the data-providing server providing identical data to the assisted server upon receiving the inquiry from the assisted server;
 wherein, when the identical data indicates the first partial data, the assisted server creates the second partial data and provides the second partial data to the client, the second partial data including the designation data indicating the data-providing server;
 wherein, when the identical data does not indicate the first partial data, the assisted server creates the second partial data and provides the second partial data to the client, the second partial data including the designation data indicating the assisted server;
 wherein the client receives the second partial data from the assisted server and receives the first partial data from one of the assisted server and the data-providing server that is indicated by the designation data included in the second partial data;
 wherein the assisted server transmits a transmission command to the data-providing server and a transmission notification to the client upon judging that the data-providing server stores the first partial data, the transmission command indicating that the data-providing server should send the first partial data to the client, the transmission notification indicating that the client should prepare to receive the first partial data from the data-providing server.

21. The client-server system as claimed in claim 20, wherein the client includes:
 a receptor that receives the transmission notification from the assisted server; and
 an acquisition device that, based on the transmission notification received by the receptor acquires the data sent from the data-providing server.

22. A method comprising:
 inquiring, with an assisted server of a second printer, regarding first partial data stored in a data-providing server of a first printer by using a broadcast via a network upon receiving a data request requesting page data over the network from a client, the data-providing server being a web server that is connected to the client by the network and storing the first partial data, the page data comprising the first partial data and second partial data, the client being a personal-computer, the data-providing server providing identical data to the assisted server upon receiving the inquiry from the assisted server, the assisted server being a web server that is connected to the client and the data-providing server by the network and storing the first partial data and the second partial data, the second partial data including designation data indicating one of the assisted server and the data-providing server;
 upon receiving the identical data indicating the first page data from the data-providing server, creating the second partial data and providing the client with the second partial data, the second partial data including the designation data indicating the data-providing server; and
 upon receiving the identical data failing to indicate the first page data from the data-providing server, creating the second partial data and providing the client with the second partial data; the second partial data including the designation data indicating the assisted server, the client receiving the second partial data from the assisted server and receiving the first partial data from one of the assisted server and the data-providing server that is indicated by the designation data included in the second partial data;
 wherein the assisted server uses an acquisition command to instruct the client to receive the first partial data from the data-providing server, the acquisition command indicating that the client should obtain the first partial data directly from the data-providing server, the client, upon receiving the acquisition command from the assisted server, sending a data request for the first partial data to the data-providing server, the data-providing server, upon receiving the data request from the client, sending the first partial data to the client.

23. A non-transitory recording medium storing programs for controlling an assisted server connected to a data-providing server and a client through a network, the recording medium storing:

an inquiring program that inquires regarding first partial data stored in a data-providing server of a first printer by using a broadcast via a network upon receiving a data request requesting page data over the network from a client, the data-providing server being a web server that is connected to the client by the network and storing the first partial data, the page data comprising the first partial data and second partial data, the client being a personal computer, the data-providing server providing identical data to an assisted server upon receiving the inquiry from the assisted server, the assisted server being a web server that is connected to the client and the data-providing server by the network and storing the first partial data and the second partial data, the second partial data including designation data indicating one of the assisted server and the data-providing server; and a creating program that creates, upon receiving the identical data indicating the first partial data from the data-providing server, the second partial data and provides the client with the second partial data, the second partial data including designation data indicating the data-providing server, and that creates, upon receiving the identical data failing to indicate the first partial data from the data-providing server, the second partial data and provides the client with the second partial data, the second partial data including designation data indicating the data-providing server, the client receiving the second partial data from the assisted server and receiving the first partial data from one of the assisted server and the data-providing server included in the second partial data;

wherein the assisted server uses an acquisition command to instruct the client to receive the first partial data from the data-providing server, the acquisition command indicating that the client should obtain the first partial data directly from the data-providing server, the client, upon receiving the acquisition command from the assisted server, sending a data request for the first partial data to the data-providing server, the data-providing server, upon receiving the data request from the client, sending the first partial data to the client.

* * * * *